US010318432B2

(12) United States Patent
Guthrie et al.

(10) Patent No.: US 10,318,432 B2
(45) **Date of Patent: *Jun. 11, 2019**

(54) IMPLEMENTING BARRIERS TO EFFICIENTLY SUPPORT CUMULATIVITY IN A WEAKLY ORDERED MEMORY SYSTEM

(71) Applicant: INTERNATIONAL BUSINESS MACHINES CORPORATION, Armonk, NY (US)

(72) Inventors: Guy L. Guthrie, Austin, TX (US); Hugh Shen, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,606

(22) Filed: Jul. 9, 2018

(65) Prior Publication Data

US 2018/0329826 A1 Nov. 15, 2018

Related U.S. Application Data

(63) Continuation of application No. 15/141,030, filed on Apr. 28, 2016, now Pat. No. 10,019,374.

(51) Int. Cl.

| | |
|---|---|
| ***G06F 12/00*** | (2006.01) |
| ***G06F 12/0893*** | (2016.01) |
| ***G06F 12/0891*** | (2016.01) |
| ***G06F 9/30*** | (2018.01) |
| ***G06F 9/38*** | (2018.01) |
| ***G06F 12/0897*** | (2016.01) |

(52) U.S. Cl.

CPC ............ *G06F 12/0893* (2013.01); *G06F 9/30* (2013.01); *G06F 9/3009* (2013.01); *G06F 9/3836* (2013.01); *G06F 9/3838* (2013.01); *G06F 12/0891* (2013.01); *G06F 12/0897* (2013.01); *G06F 9/30043* (2013.01); *G06F 9/30087* (2013.01); *G06F 2212/1024* (2013.01); *G06F 2212/60* (2013.01)

(58) Field of Classification Search

CPC .... G06F 12/0897; G06F 2212/60; G06F 9/30; G06F 9/30043; G06F 9/30087; G06F 9/3009; G06F 9/3836; G06F 9/3838

See application file for complete search history.

(56) References Cited

U.S. PATENT DOCUMENTS

2014/0380024 A1* 12/2014 Spadini ................ G06F 9/3834 712/217

OTHER PUBLICATIONS

Alglave et al., "Software Verification for Weak Memory via Program Transformation", Department of Computer Science, Jul. 30, 2012.

(Continued)

*Primary Examiner* — Shawn X Gu

(74) *Attorney, Agent, or Firm* — Brian F. Russell; Bryan Bortnick

(57) ABSTRACT

A technique for operating a lower level cache memory of a data processing system includes receiving an operation that is associated with a first thread. Logical partition (LPAR) information for the operation is used to limit dependencies in a dependency data structure of a store queue of the lower level cache memory that are set and to remove dependencies that are otherwise unnecessary.

12 Claims, 17 Drawing Sheets

(56) References Cited

OTHER PUBLICATIONS

Alglave et al.,"Partial Orders for Efficient Bounded Model Checking of Concurrent Software", In International Conference on Computer Aided Verification, Jul. 13, 2013.
Alglave et al., "Fences in Weak Memory Models", In International Conference on Computer Aided Verification, Jul. 15, 2010.
Alglave et al., "Stability in Weak Memory Models", In International Conference on Computer Aided Verification, Jul. 14, 2011.
Alglave et al., "A Shared Memory Poetics", 2010.
McKenney, "Memory Barriers: a Hardware View for Software Hackers", Linux Technology Center, IBM Beaverton. Jun. 7, 2010.
Alglave et al., "Fences and Synchronisation Idioms in Weak Memory Models", PhD diss., INRIA, 2009.
Alglave, "A formal hierarchy of weak memory models", Formal Methods in System Design. Oct. 1, 2012.
Sarkar et al. "Understanding Power Multiprocessors" ACM SIGPLAN Notices. Jun. 4, 2011.
Alglave et al., "The Semantics of Power and ARM Multiprocessor Machine Code", In Proceedings of the 4th workshop on Declarative aspects of multicore programming. AMC. Jan. 20, 2009.
Alglave et al., "Stability in Weak Memory Models With Proofs", 2009.
Alglave et al., "Partial Orders for Efficient BMC of Concurrent Software", Jan. 8, 2013.
Alglave et al., "Don't sit on the fence a static analysis approach to automatic fence insertion", Jun. 9, 2014.
Alglave et al., "Fences in weak memory models (extended version)", Formal Methods in System Design. Apr. 1, 2012.
Cain et al., "Robust Architectural Support for Transactional Memory in the Power Architecture", ACM SIGARCH Computer Architecture News. Jun. 26, 2013.
McKenney et al.,"Power Implementation for C/C++ Memory Model", 2009.
Guthrie et al. U.S. Appl. No. 15/141,013, filed Apr. 28, 2016, Non-Final Office Action dated Aug. 10, 2017.
Guthrie et al. U.S. Appl. No. 15/141,013, filed Apr. 28, 2016, Notice of Allowance dated Dec. 26, 2017.
Guthrie et al. U.S. Appl. No. 15/141,030, filed Apr. 28, 2016, Non-Final Office Action dated Oct. 18, 2017.
Guthrie et al. U.S. Appl. No. 15/141,030, filed Apr. 28, 2016, Notice of Allowance dated Mar. 2, 2018.

* cited by examiner

IMPLEMENTING BARRIERS TO EFFICIENTLY SUPPORT CUMULATIVITY IN A WEAKLY ORDERED MEMORY SYSTEM

BACKGROUND

The disclosure is generally directed to a data processing system having a weakly-ordered memory system and, more particularly, to techniques for implementing barriers to efficiently support cumulativity in a data processing system having a weakly-ordered memory system.

In computing, a memory model describes the interactions of threads through memory and how threads share data. Memory barriers are widely utilized in data processing systems that are configured to perform out-of-order program execution, which refers to reordering of memory operations (i.e., load and store operations) for execution. A barrier instruction (barrier) can, for example, cause all load instructions (loads) and store instructions (stores) prior to the barrier to be committed prior to any loads and stores issued following the barrier. Some architectures provide separate acquire and release barriers that address the visibility of read-after-write operations from the point of view of a reader or writer, respectively. Still other architectures provide separate barriers to control ordering between different combinations of operations targeting system memory and input/output (I/O) memory.

BRIEF SUMMARY

A technique for operating a lower level cache memory of a data processing system includes receiving an operation that is associated with a first thread. Logical partition (LPAR) information for the operation is used to limit dependencies in a dependency data structure of a store queue of the lower level cache memory that are set and to remove dependencies that are otherwise unnecessary.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a cache, and a data processing system that implement barriers to efficiently support cumulativity in a weakly-ordered memory system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements. As may be used herein, the term 'system memory' is synonymous with the term 'main memory' and does not include 'cache' or 'cache memory'.

Modern processors typically include storage hierarchies (i.e., caches) integrated into a single integrated circuit. For example, modern processors may include one or more processor cores that include level 1 (L1) instruction and/or data caches and level 2 (L2) instruction and/or data caches coupled to a shared interconnect bus. In order to increase efficiency, processor chips are often designed with a store queue (STQ) that is typically located in an L2 cache and receives stores from a write-through L1 cache for coalescing and processing into the L2 cache. A STQ typically includes byte-addressable storage for a number of cache lines (e.g., 8 to 16 cache lines).

Figure 1:
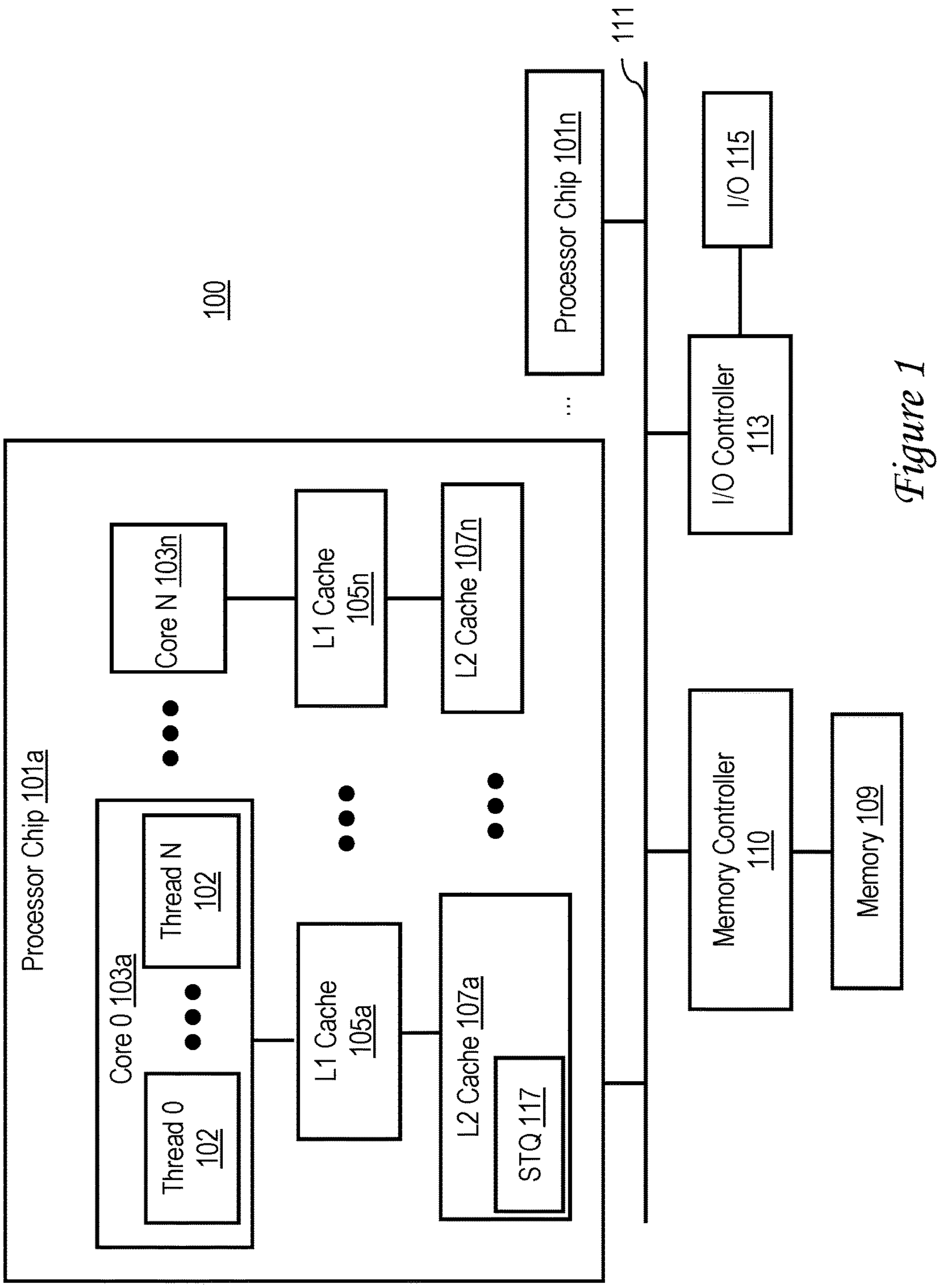
FIG. 1 is a diagram of a relevant portion of an exemplary data processing system that is configured to implement barriers to efficiently support cumulativity in a weakly-ordered memory system, according to one or more embodiments of the present disclosure.

With reference now to the figures and in particular, with reference to FIG. 1, a multi-processor data processing system (MP) 100 is illustrated that includes one or more processor chips 101, memory 109, and input/output (I/O) device(s) 115. As is shown, I/O device(s) 115 have an associated I/O controller 113 and memory 109 has an associated memory controller 110 that controls access to memory 109. Processor chips 101 are coupled to memory 109 and I/O devices 115 via an interconnect 111 (e.g., a system bus that includes address, data, and control lines) by which processor chips 101 communicate with each other and with memory 109, I/O devices 115, and other peripheral devices. Interconnect 111 may be a bifurcated bus with a data bus for routing data and a separate address bus for routing address transactions and other operations or a more generalized interconnect possibly consisting of multiple point-to-point links between processor chips 101.

Processor chips 101 each include multiple (e.g., eight) processor cores 103 (each of which may execute one or more threads 102 and have an associated L1 cache 105 and an L2 cache 107. Each cache 105 and 107 includes a cache directory, an array of cache lines, and all data operations are completed according to a coherency protocol, e.g., a MESI coherency protocol or a variant thereof. The various features of the invention may be carried out by logic components on processor chips 101 and affect buffering of store operations at store queue (STQ) 117 and selection of entries for dispatch. For illustrative purposes, the various embodiments are described from the perspective of updating a cache line in an L2 cache with store operations and synchronization operations issued by a processor core and temporarily buffered in an STQ entry. An exemplary cache line may include multiple blocks/granules of data, corresponding to individual bytes, words, double words, etc., each of which may be the target of an update by a processor-issued store operation. The specific size of each cache line and number of updateable data blocks/granules may differ from system to system.

While the present invention is described with specific reference to an L2 cache within a multi-level cache architecture, it should be understood that the disclosed embodiments may be implemented at a different cache level. Embodiments of the present disclosure are described with reference to MP 100 and component parts of MP 100 illustrated by FIGS. 1, 10, 13, and 16 (described below), but the present invention may be applied to different configurations of data processing systems that are not necessarily conventional. As an example, embodiments of the present disclosure may be implemented within a non-uniform memory access (NUMA) system, wherein the system memory (random access memory (RAM)) is divided among two or more memory arrays (having separate memory controllers connected to the system bus) and allocated among the processing units. Also, MP 100 may include additional hardware components not shown in FIG. 1, or have a novel interconnect architecture for existing components. MP 100 may also have a different number of processing units. Those skilled in the art will therefore appreciate that the present invention is not limited to the generalized data processing system illustrated in FIG. 1.

Weakly-ordered memory systems exploiting so called 'weak memory models' allow for a great deal of reordering of operations and for storage modifying operations to affect other processors in a non-atomic fashion (i.e., stores may take effect at various processor cores at different points in time). In weakly-ordered memory systems, in certain circumstances, it is desirable to enforce ordering and atomicity of operations. A typical mechanism for enforcing operation ordering and atomicity has utilized a 'synchronization fence', or 'barrier' instruction. Barrier instructions (barriers) force various load and store instructions (loads and stores) on either side of the barrier to be performed in-order relative to the barrier and to possibly restore the atomicity of stores (depending on barrier type) under certain circumstances. Barrier performance is generally a critical aspect of weak memory model machines and, as such, it is desirable to ensure that barriers execute in an efficient manner. In particular, achieving atomicity can often require that a barrier executed by one thread cause operations performed by another thread to be propagated in a specific manner in order to restore atomicity.

Figure 2:
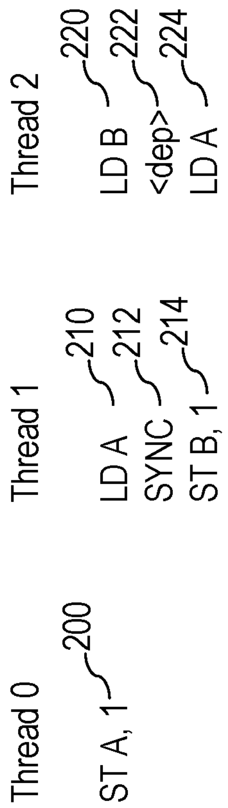
FIG. 2 is a diagram of an exemplary code snippet that is used to explain A-cumulativity.

With reference to FIG. 2, program snippets executed by thread zero (T0), thread 1 (T1), and tread 2 (T2) are provided to illustrate a notion referred to as A-cumulativity. In the program snippets of FIG. 2 (and similarly in FIG. 3 discussed below) it is assumed that threads 'T0' and 'T1' execute within data processing system 100 on a same processor core 103 (thereby sharing an L1 cache 105) and thread 'T2' executes on a different processor core and therefore accesses a different L1 cache 105. In the program snippets, it is assumed that all locations (i.e., addresses 'A' and 'B') start with an initial value of '0', 'SYNC' is a barrier instruction, and '<dep>' is an instruction or sequence of instructions that creates a data dependency that requires loads (i.e., LD B and LD A) on thread 'T2' to be performed in program order (this can be achieved, for example, by utilizing the value returned by an earlier load to form an address of a subsequent load). When threads 'T0' and 'T1' execute on a single processor core (i.e., share an L1 cache), it is possible for the thread 'T1' to read a value stored by 'T0' (e.g., upon executing ST A, 1) from the L1 cache before a store to address 'A' (e.g., ST A, 1) has propagated to the thread 'T2', which executes on a different processor core. Following execution of a load to address 'A' (e.g., LD A), the thread 'T1' executes a SYNC followed by a store to address 'B' (e.g., ST B, 1).

Since the barrier (SYNC) is cumulative (i.e., any stores by other threads that are visible to the thread executing the barrier must also be propagated by the barrier ahead of any stores that occur in the thread after the barrier instruction), the SYNC for the thread 'T1' ensures that the store to address 'A' (i.e., ST A, 1) becomes visible to any given processor core (in this case the processor core that executes the thread 'T2') before the store to address 'B' (i.e., ST B, 1) becomes visible to that processor core (T2). In conventional implementations, this is achieved by having barriers from a given processor core force all older stores, regardless of the thread that executed the store, through a store queue (STQ) of an associated L2 cache before any stores from that core that are younger than the barrier. The above scenario is referred to herein as 'A-cumulativity'. Unfortunately, this cross-thread ordering occurs whether or not the thread executing the barrier has actually read from storage locations updated by other cross-thread stores. In the absence of a read that establishes the visibility of a cross-thread store to the thread executing the barrier, it is not strictly necessary to propagate the other thread store ahead of the barrier. While the conventional implementation is relatively simple to realize, the conventional implementation can cause performance delays for a given barrier which may have to wait for many stores in the STQ that are not architecturally required to be ordered by the barrier.

Execution of the exemplary program in FIG. 2 illustrates the property of causality in a multiprocessor data processing system. As used herein 'causality', which is a desirable property in multiprocessor programs, is defined as being preserved if, during execution of a multiprocessor program, a given thread of execution cannot read the effects (e.g., the LD of B in T2) of a computation before the writes that caused the computation (e.g. the ST of A by T0) can be read by the given thread.

In FIG. 2, thread 'T0' executes a store 200 that writes a value of '1' to address 'A' in the distributed shared memory system. This update of address 'A' propagates to thread 'T1', and load 210 executed by thread 'T1' therefore returns a value of 1 (as thread 'T0' and thread 'T1' execute on a same processor core 103 and access a same L1 cache 105). Even though the memory update made by store 200 has propagated to thread 'T1', that memory update may not yet have propagated to thread 'T2' (as thread 'T2' executes on a different processor core 103 and accesses a different L1 cache 105). If store 214 executes on thread 'T1' and the associated memory update propagates to thread 'T2' before the memory update of store 200 propagates to thread 'T2', causality would be violated because the store of the value of '1' to address 'B', which is an effect of the store to address 'A', would be visible to thread 'T2' before the memory update associated with store 200 was visible to thread 'T2'.

To guarantee causality in a weak memory model system, barrier 212 (i.e., a synchronization instruction (SYNC)) is implemented to ensure that store 214 does not take effect or begin propagating its memory update to other processor cores until load 210 has bound to its value. In addition, barrier 212 also ensures that the memory update associated with store 200 propagates to thread 'T2' before the memory update associated with store 214. Thus, causality is preserved because the cause of the computation (i.e., the memory update of store 200) is visible to thread 'T2' before the result of the computation (i.e., the memory update of store 214). Data dependency 222 is also enforced by thread 'T2' to ensure that the thread 'T2' executes loads 220 and 224 and binds their values in program order to guarantee that the thread 'T2' properly observes the memory updates made by the thread 'T0' and the thread 'T1'.

Figure 3:
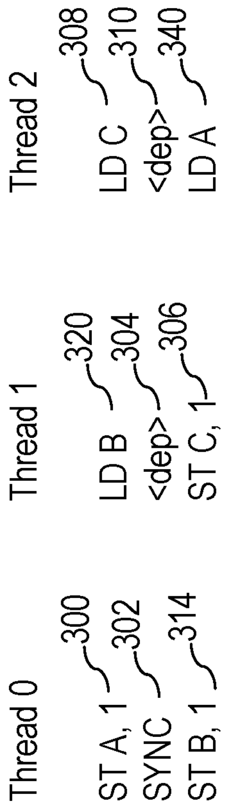
FIG. 3 is a diagram of an exemplary code snippet that is used to explain B-cumulativity.

With reference to FIG. 3, different program snippets, executed by thread zero (T0), thread 1 (T1), and thread 2 (T2) are provided to illustrate the notion referred to as B-cumulativity. In FIG. 3, it is assumed that threads 'T0' and 'T1' execute on a same processor core 103, and thread 'T2' executes on a different processor core 103. Thread 'T0' executes a store 300 that writes a value of '1' to address 'A' in the distributed shared memory system, a SYNC 302, and a store 314 that writes a value of '1' to address 'B' in the distributed shared memory system. The thread 'T1' executes a load 320 that reads a value at address 'B' in the distributed shared memory system, a data dependency (<dep>) 304, and a store 306 that writes a value of '1' to address 'C' in the distributed shared memory system. The thread 'T2' executes a load 308 that reads a value at address 'C' in the distributed shared memory system, a data dependency (<dep>) 310, and a load 340 that reads a value at address 'A' in the distributed shared memory system. In the program snippets, the B-cumulativity property of SYNC 302 ensures that store 300 propagates to any given processor core 103 before any store (in this case store 306) that occurs after a load that has read from any store ordered after the barrier (in this case store 314). B-cumulativity is extended recursively through as many threads as are applicable (by virtue of reading some store ordered after the barrier or ordered after a load that has read from a store previously ordered after the barrier). Therefore SYNC 302, executed by the thread 'T0', ensures that store 314 to address 'B' (i.e., ST B, 1) which occurs after SYNC 302 on the thread 'T0' and store 306 to address 'C' (i.e. ST C, 1) will occur at all processor cores 103 in the system after store 300 to address 'A' (i.e., ST A, 1). This ensures that the thread 'T2' will read the new value of '1' at the address 'A' if thread 'T1' reads the value of '1' at the address 'B'.

Figure 4:
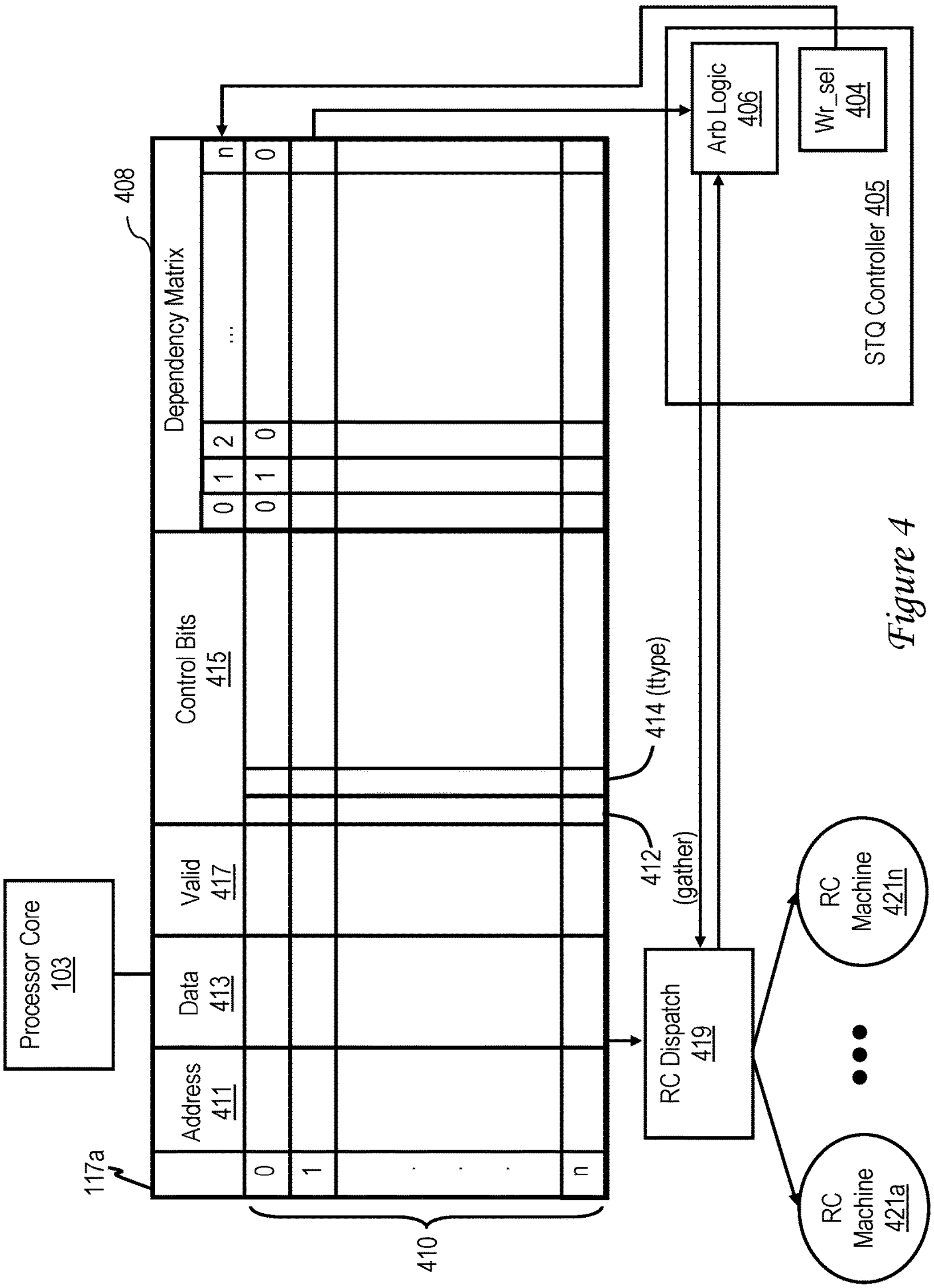
FIG. 4 is a diagram of an exemplary conventional store queue (STQ) and associated logic that implements barriers to support cumulativity in a weakly-ordered memory system.
Figure 10:
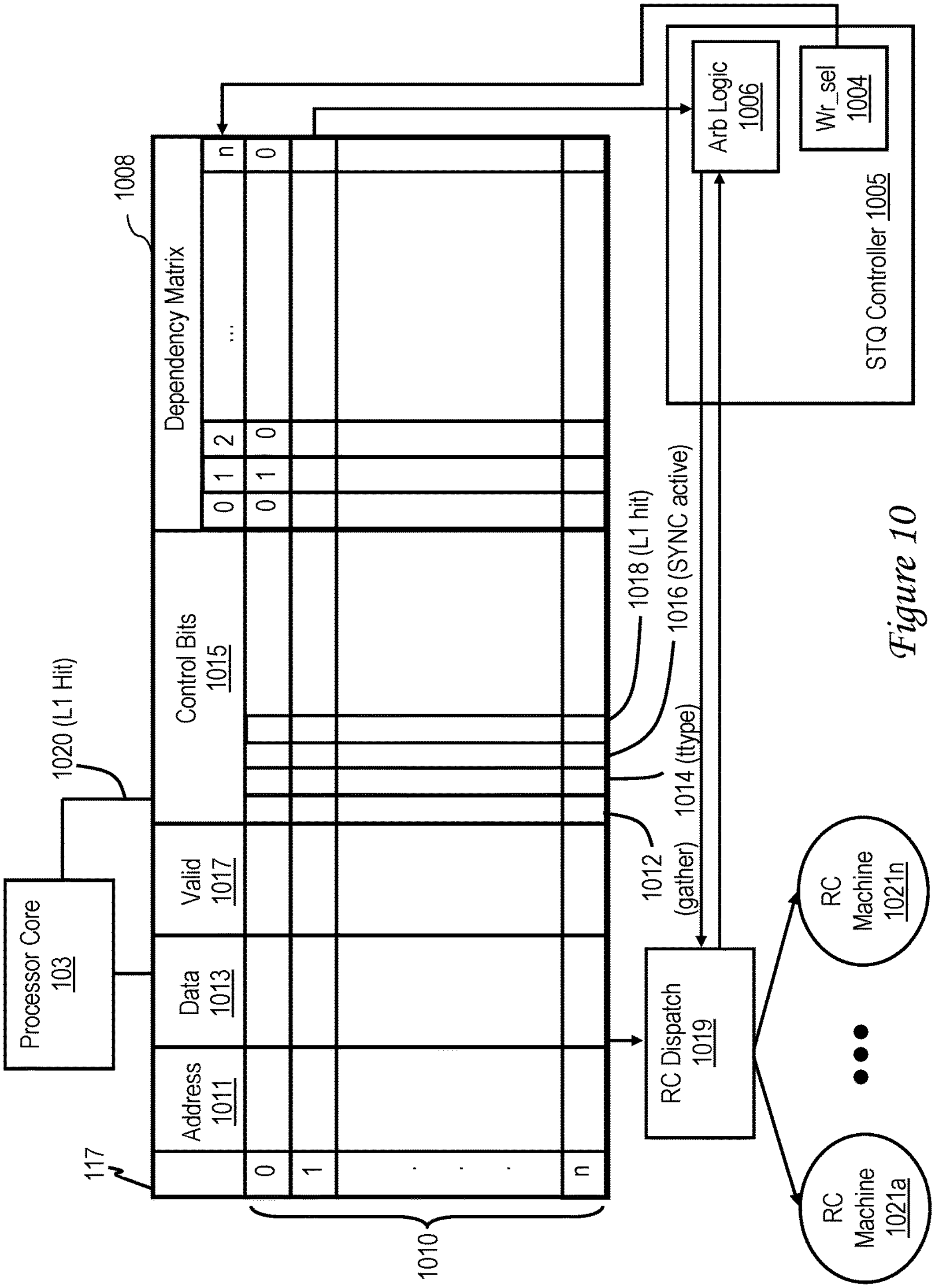
FIG. 10 is a diagram of an exemplary STQ and associated logic that is configured according to one embodiment of the present disclosure to implement barriers to efficiently support cumulativity in a weakly-ordered memory system.
Figure 13:
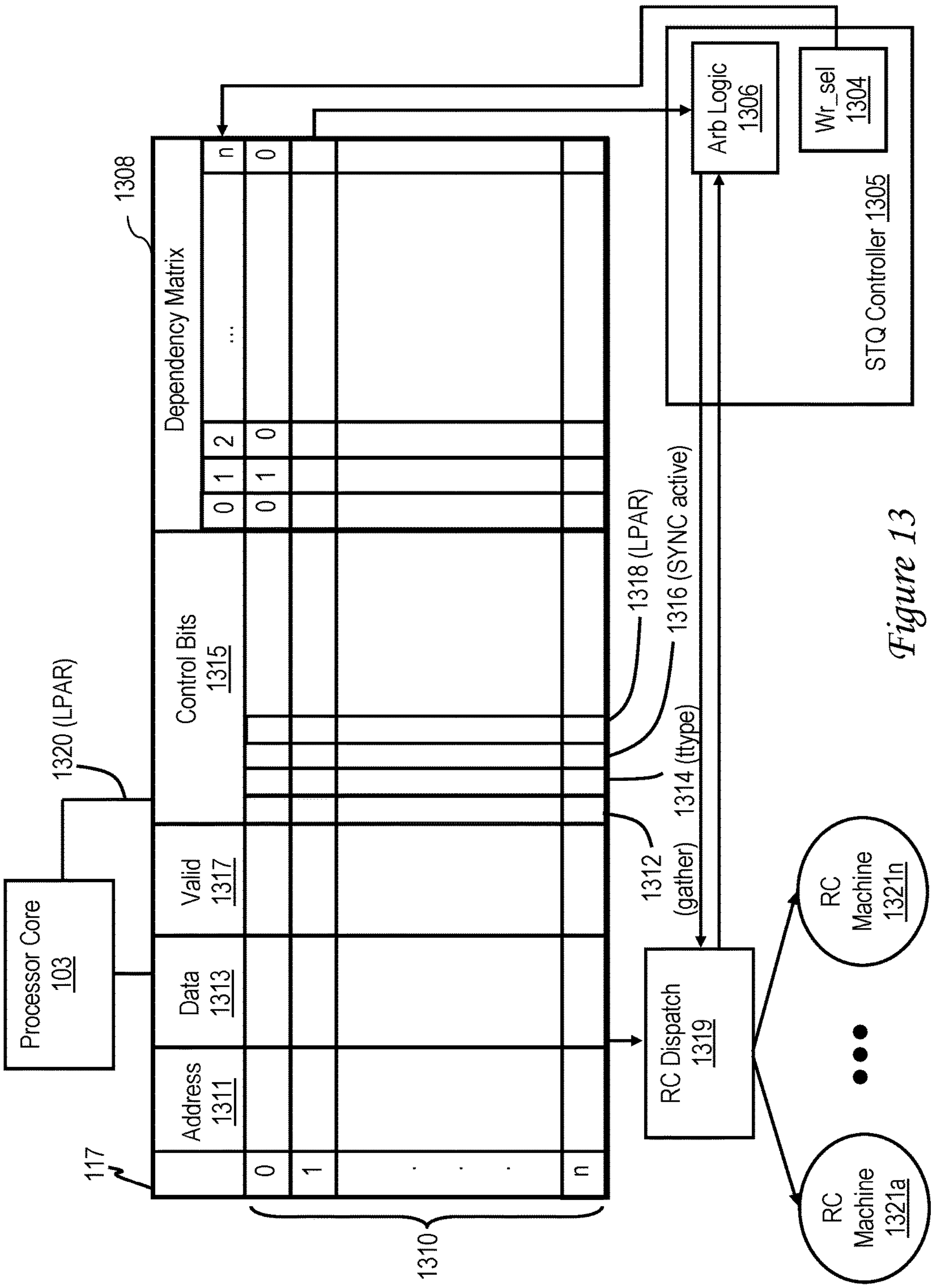
FIG. 13 is a diagram of an exemplary STQ and associated logic that is configured according to another embodiment of the present disclosure to implement barriers to efficiently support cumulativity in a weakly-ordered memory system.
Figure 16:
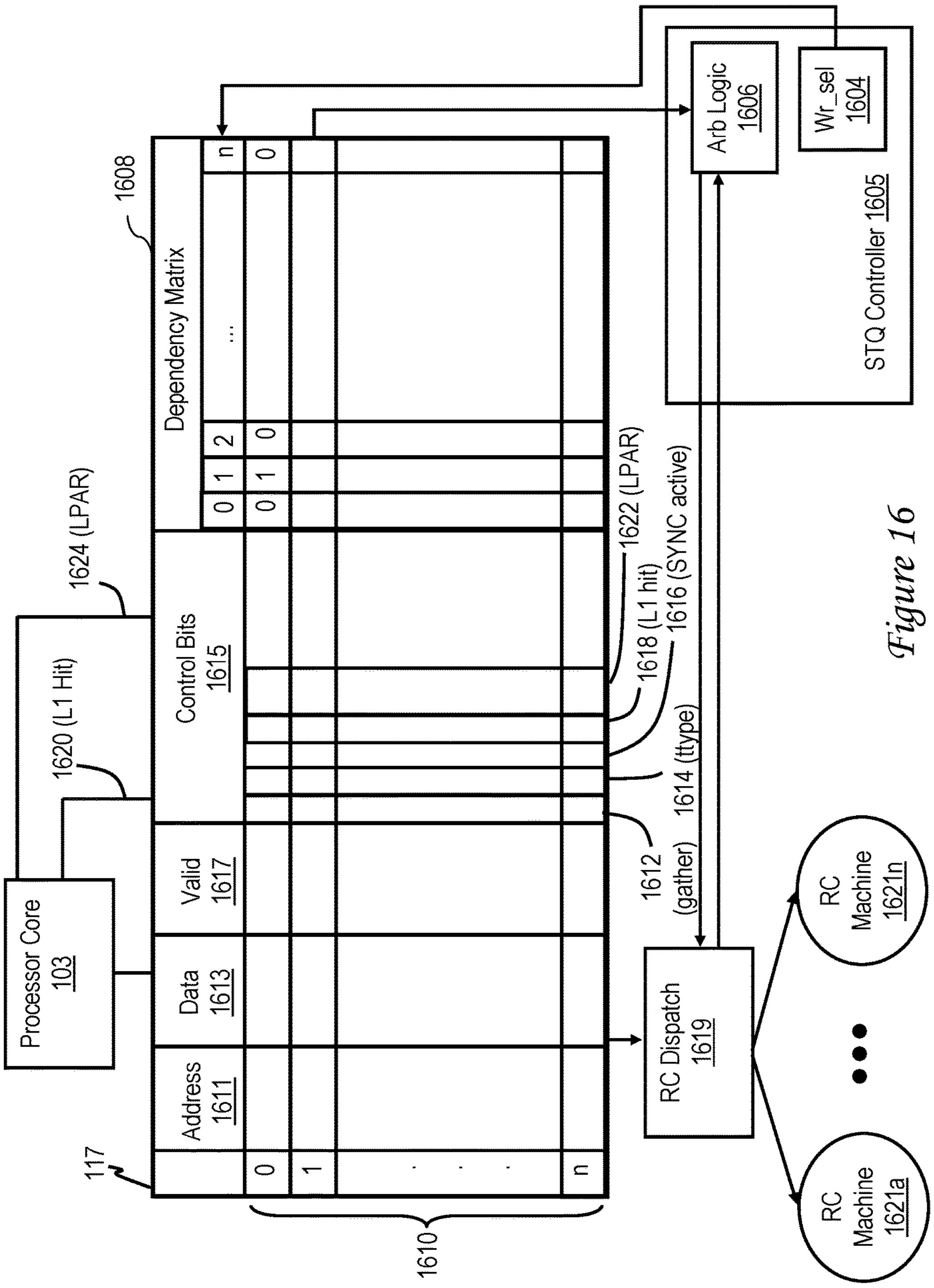
FIG. 16 is a diagram of an exemplary STQ and associated logic that is configured according to yet another embodiment of the present disclosure to implement barriers to efficiently support cumulativity in a weakly-ordered memory system.

With reference to FIG. 4, a conventional store queue (STQ) 117*a* is illustrated in relevant part that is replaced by STQ 117, which may take the forms illustrated in FIG. 10, 13, or 16. As illustrated, STQ 117*a* includes a collection of entries 410 comprised of standard registers for storing information regarding store and barrier operations, namely address register 411, data register 413, control bits 415, and valid bit 417. Address register 411 contains the address, if applicable, of the operation in the entry, data register 413 contains store data values if the entry holds a store operation, and valid bit 417 indicates that entry contains a valid operation. STQ 117*a* also includes a byte enable register (not shown) that includes a number of bits, each corresponding to a smallest size of store granule within data register 413 indicating those bytes, if any, in register 413 that contain valid data. Among other control information, control bits 415 also include a gather bit 412 and a transaction type (ttype) field 414. Gather bit 412 is utilized to determine whether subsequent store operations to the same address may be gathered (also known as coalescing) into the entry. The interval of time in which gather bit 412 is active is known as a 'gather window'. Such gathering of stores reduces traffic to L2 cache 107 and to main memory 109. Transaction type (ttype) field 414 is utilized to indicate the type of operation contained in the entry within STQ 117*a,* minimally whether the associated operation is a store or some form of barrier instruction (SYNC). For simplicity, the discussion herein utilizes cache lines having a length/capacity of 128-bytes that are updated via a plurality of processor-issued store operations.

STQ 117*a* also includes a dependency matrix 408 that includes a number of bits, where each row represents dependencies of each store queue entry on other store queue entries. For example, a '1' in a row indicates that the entry corresponding to that row cannot be dispatched until the STQ entry corresponding to the column with the '1' has dispatched and, if necessary, completed processing in RC machine 421. For example, as depicted in FIG. 4, store queue entry '0' is dependent on store queue entry '1' and, as such, store queue entry '0' cannot be dispatched before store queue entry '1' has been dispatched and completed processing in RC machine 421. STQ controller 405 includes a write select (Wr_sel) pointer 404 and arbitration (Arb) logic 406. Write select pointer 404 selects empty entries to hold new operations when a processor core 103 sends a new operation to STQ 117*a* that does not gather into an existing entry. It should be appreciated that write select pointer 404 can utilize any appropriate algorithm to select an empty store queue entry, such as with a priority encode algorithm that enables write select pointer 404 to select an empty entry from any entry with valid bit 417 set to '0' (indicating an entry that may be overwritten).

Arbitration logic 406 examines STQ 117*a* for eligible entries to send to RC dispatch logic 419 for dispatch to RC machines 421. A store queue entry 410 is eligible for transmission to RC dispatch logic 419 when the dependency matrix row corresponding to the particular store queue entry indicates that all dependencies are cleared and other necessary processing in RC machines 421 have completed. RC machines 421 independently and concurrently service load (LD) and store (ST) requests received from an affiliated processor core 103.

In order to service remote memory access requests originating from non-affiliated processor cores 103, i.e., processor cores that do not share an L2 cache, L2 cache 107 may also include multiple snoop machines (not shown). Each snoop machine can independently and concurrently handle a remote memory access request "snooped" from local interconnect 111. As will be appreciated, the servicing of memory access requests by RC machines 421 may require the replacement or invalidation of memory blocks within a cache array (not shown) of L2 cache 107. L2 cache 107 may also include CO (castout) machines (not shown) that manage the removal and writeback of memory blocks from the cache array. While an RC machine 421 is processing a local memory access request, RC machine 421 has a busy status and is not available to service another request. RC machine 421 may, however, perform a directory write to update a relevant entry of a directory while busy. In addition, RC machine 421 may also perform a cache write to update the relevant cache line of a cache array and other functions.

Figure 5:
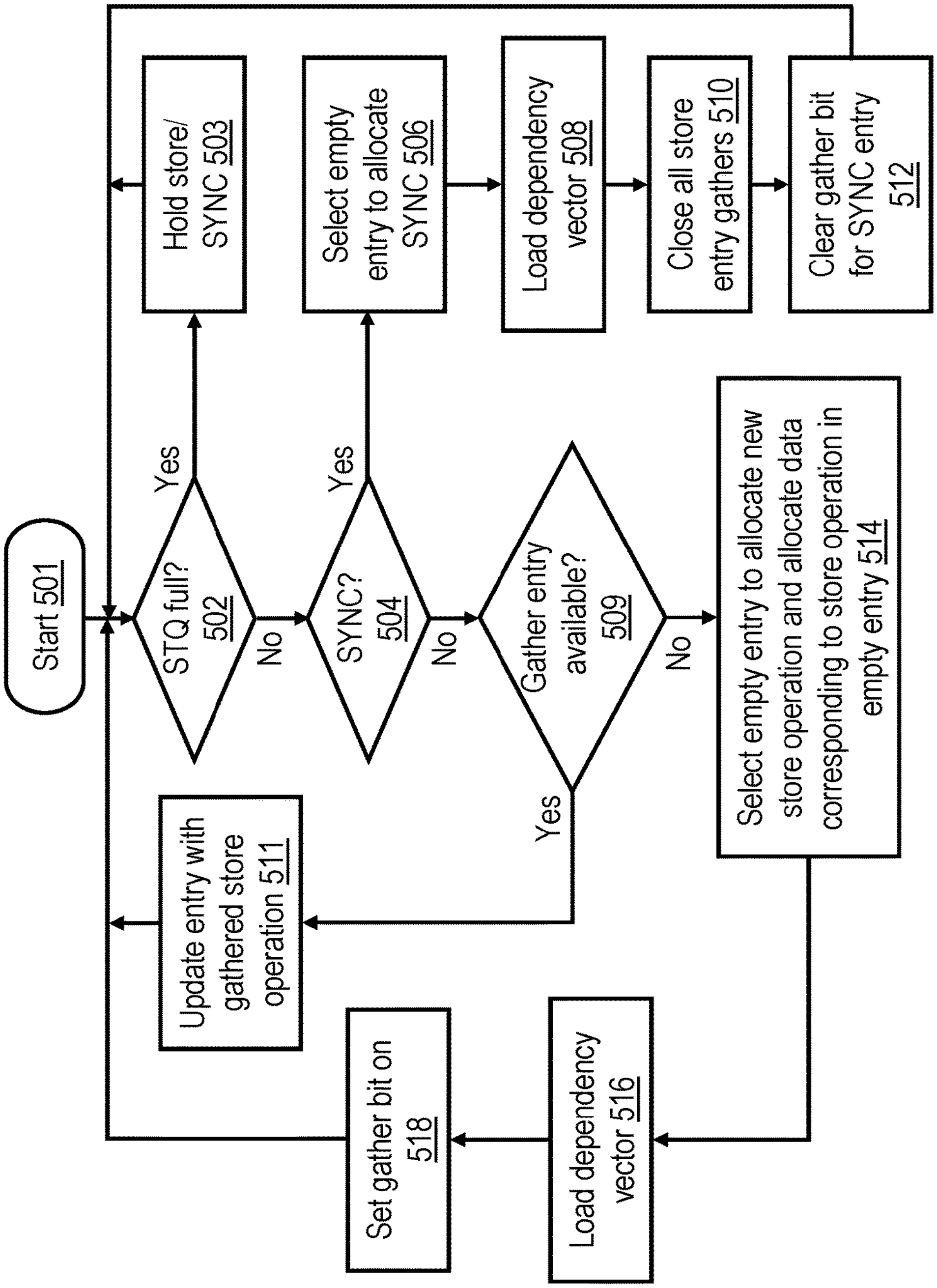
FIG. 5 is a flowchart of an exemplary conventional process for handling barriers (i.e., synchronization instructions (SYNCs)) and store instructions (stores) in a conventional STQ.

FIG. 5 is a high-level logical flowchart depicting an exemplary conventional process employed in writing a new store queue entry in response to a store queue (STQ) receiving a new store or SYNC operation from an associated processor core. In the discussion of FIGS. 5-9 reference is made to components of FIGS. 1 and 4, as the components conventionally operated, to facilitate better understanding. The process of FIG. 5 begins at block 501 in response to, for example, a processor core 103 issuing a store operation or a SYNC operation to STQ 117*a*. In decision block 502, STQ controller 405 determines whether STQ 117*a* is full. In response to STQ 117*a* being full in block 502 control transfers to block 503, where STQ controller 405 sends a message instructing processor core 103 to halt sending store operations and SYNCs until some entries in STQ 117*a* have been dispatched by associated RC dispatch logic 419. From block 503, control returns to block 502.

In response to STQ 117*a* not being full in block 502 control transfers to decision block 504, where STQ controller 405 determines whether the issued operation is a SYNC. In response to the issued operation being a SYNC, control transfers to block 506. In block 506, STQ controller 405 selects an empty entry in STQ 117*a* in which to allocate the SYNC. Next, in block 508, STQ controller 405 loads the dependency vector in dependency matrix 408 for the SYNC (see blocks 604 and 609 of FIG. 6). For example, if for a new SYNC operation write select pointer 404 updates store queue entry '0' and STQ controller 405 determines that entry '0' is dependent only on entry '1', STQ controller 405 enters a '1' into row 0, column 1 of dependency matrix 408 while entering a '0' in the rest of the columns in row 0. Next, in block 510, STQ controller 405 closes all currently active store entry gather bits 412 to ensure that a store after the barrier does not re-order ahead of the barrier by gathering into an older entry in STQ 117*a*. Then, in block 512, STQ controller 405 clears gather bit 412 for the SYNC entry (stores and other SYNCs may not gather with a SYNC). From block 512 control returns to block 502.

In response to the issued operation not being a SYNC in block 504 (i.e., a store operation was received at STQ 117*a*), control transfers to decision block 509 where STQ controller 405 determines, by examining address registers 411 and gather bits 412, whether an existing entry (for the same cache line address) is currently available for gathering the store operation. It should be appreciated that gathering of store operations involves combining a series of store operations writing to the same cache line in STQ 117*a* in the same store queue entry before the cache line is dispatched to the RC dispatch logic 419. If STQ controller 405 determines that the new store operation can be gathered into an existing STQ entry, the process continues to block 511, where STQ controller 405 updates gatherable entry data field 413 with data of the new store operation. From block 511, control returns to block 502 and continues in an iterative fashion.

In response to a determination at block 509 that the new store operation cannot be gathered into an existing STQ entry, control transfers to block 514. In block 514 STQ controller 405 (using write select pointer 404) selects an empty entry to allocate to the new store operation. The new data, address, and byte enable data corresponding to the new store operation are inserted into the new entry by STQ controller 405. Next, in block 516, STQ controller 405 loads the dependency vector for the store (see blocks 606, 608, and 609 of FIG. 6). A new entry is dependent on another STQ entry if, among other things, the store operation characterized by the new entry requires an access to the same address as the other store queue entry or the other STQ entry is a SYNC operation. STQ controller 405 also clears the bits in dependency matrix 408 corresponding to STQ entries on which the new entry is not dependent. Next, in block 518, STQ controller 405 sets gather bit 412 of the new entry to enable store gathering in the new entry. Following block 518 control returns to block 502.

Figure 6:
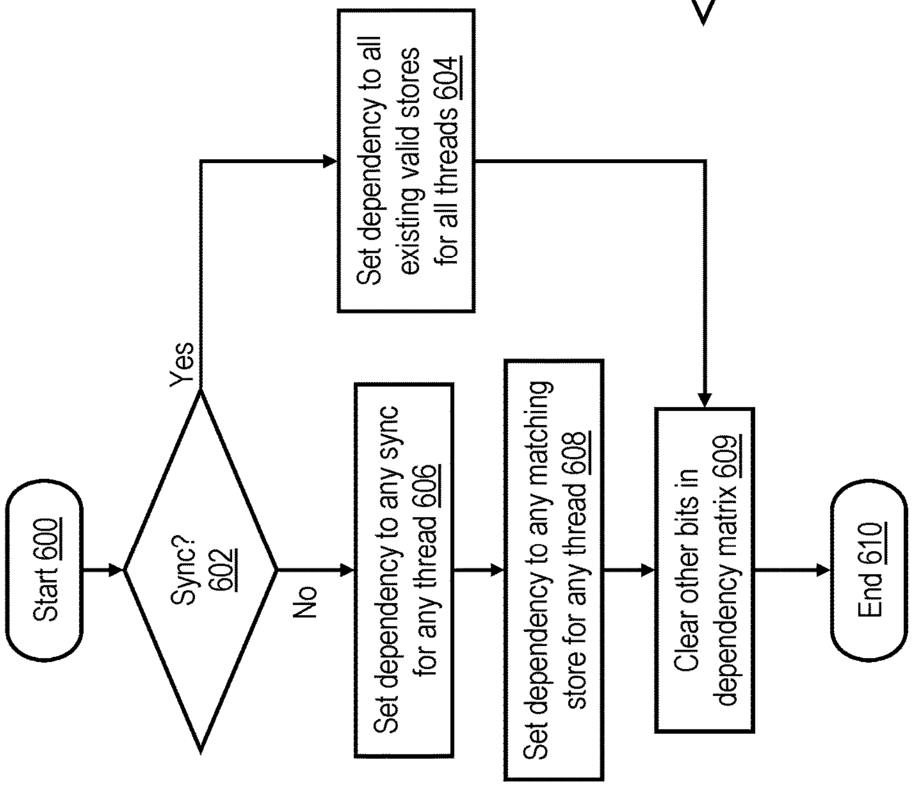
FIG. 6 is a flowchart of an exemplary conventional process for setting dependencies for SYNCs and stores in a conventional STQ.

With reference to FIG. 6, a flowchart of an exemplary conventional process for setting dependencies in dependency matrix 408 for SYNCS and stores in STQ 117*a* of FIG. 4 is illustrated. The process is initiated in block 600 in response to STQ 117*a* receiving an operation (i.e., a SYNC or store operation) from processor core 103. Next, in decision block 602 STQ controller 405 determines whether the received operation is a SYNC. In response to the received operation being a SYNC in block 602, control transfers to block 604 where STQ controller 405 sets a dependency in dependency matrix 408 for the store to all existing valid stores for all threads in STQ 117*a*. As described above with reference to FIGS. 2 and 3, setting a dependency to all valid stores regardless of thread partially ensures A and B cumulativity, but may also order more stores than is strictly necessary. Following block 604, control transfers to block 609 where STQ controller 405 clears other bits in dependency matrix 408. Following block 609 control transfers to block 610 where the process terminates. In response to the received operation not being a SYNC (i.e., the received operation is a store) in block 602, control transfers to block 606 where the STQ controller 405 sets a dependency in dependency matrix 408 for the store to any SYNC for any thread. As described above with respect to FIGS. 2 and 3, setting a dependency for the store to the SYNC for any thread partially ensures A and B cumulativity, but may also order more stores than is strictly necessary. Next, in block 608, STQ controller 405 sets a dependency in dependency matrix 408 to any matching store (i.e., a store that shares the same target address) for any thread. Following block 608, control transfers to block 609 (where STQ controller 405 clears other bits in dependency matrix 408) and then block 610 where the process terminates.

Figure 7:
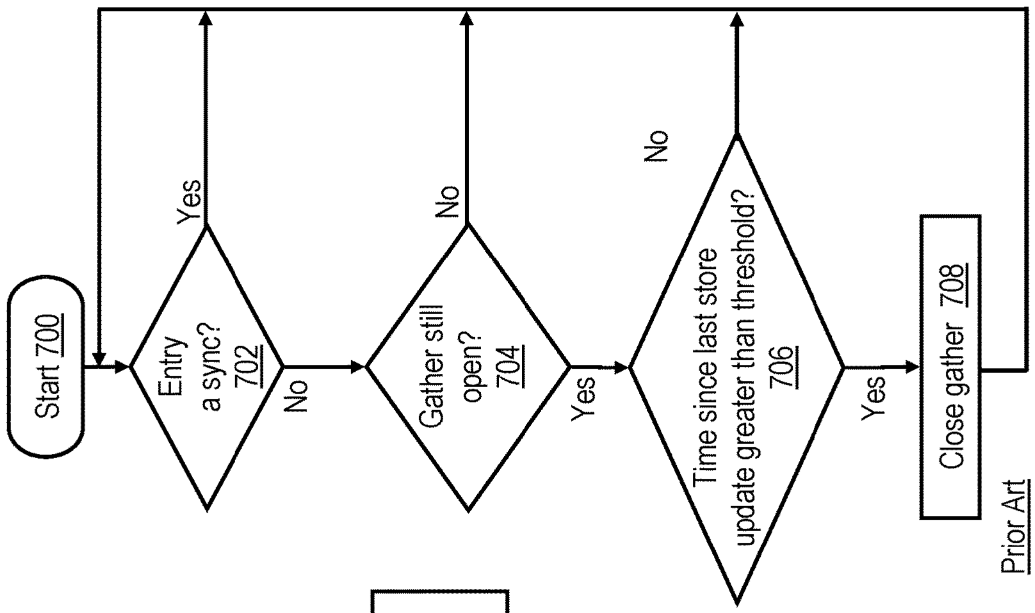
FIG. 7 is a flowchart of an exemplary conventional process for closing a store gather window.

With reference to FIG. 7, a flowchart of an exemplary conventional process for closing a gather window by resetting gather bit 412 for an entry in STQ 117*a* is illustrated. The process depicted in FIG. 7 executes in parallel for all store queue entries. The process is initiated in block 700, at which point control transfers to decision block 702. In block 702, STQ controller 405 determines whether the entry in STQ 117*a* is a SYNC. In response to the entry being a SYNC in block 702 control loops on block 702, as nothing gathers with a SYNC and therefore gather bit 412 is never set. In response to the entry not being a SYNC (i.e., the entry is a store) in block 702 control transfers to decision block 704, where STQ controller 405 determines whether the gather window for the entry is still open (e.g., whether gather bit 412 is still set).

In response to the gather window not being open (i.e., gather bit 412 is reset) in block 704, control transfers to block 702. In response to the gather window being open in block 704, control transfers to decision block 706. In block 706, STQ controller 405 determines whether a time since a last store update (either the initial store entering the entry or some other store gathering into the entry) for the entry has exceeded a threshold. In response to the time since the last store update for the entry not being greater than the threshold in block 706, control transfers to block 702. In response to the time since the last update for the entry being greater than the threshold in block 706, control transfers to block 708 where the STQ controller 405 closes the gather window by resetting gather bit 412 for the entry. Control then transfers to block 702 and the process proceeds in an iterative fashion.

Figure 8:
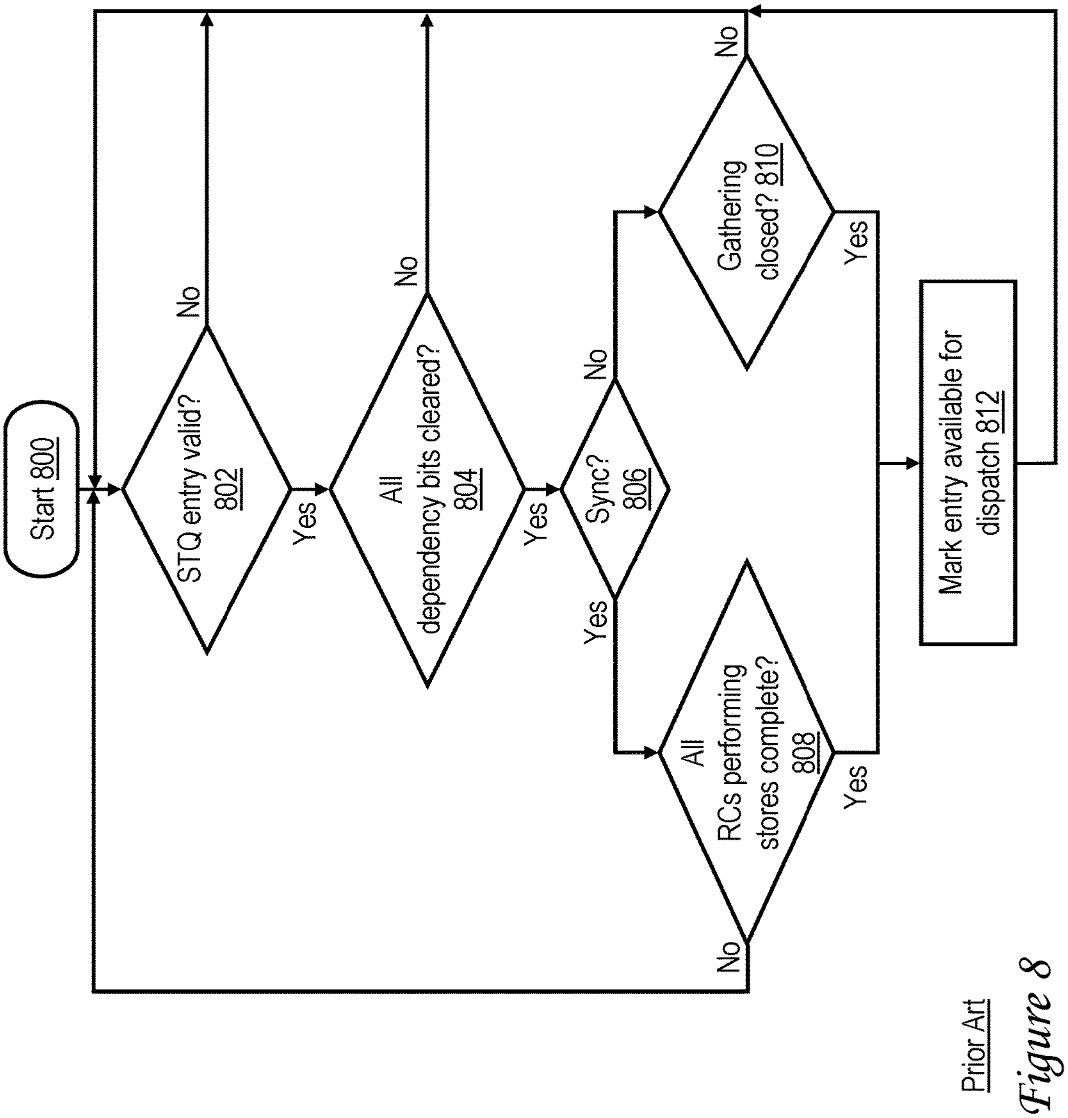
FIG. 8 is a flowchart of an exemplary conventional process for marking an entry in a conventional STQ available for dispatch to a read-claim (RC) machine.

In reference now to FIG. 8, illustrated is a high-level logical flowchart of an exemplary conventional process for determining whether a specific entry in STQ 117*a* is eligible for dispatch by RC dispatch logic 419. The process depicted in FIG. 8 executes in parallel for all store queue entries. The process begins at block 800 and proceeds to block 802, where STQ controller 405 determines whether or not a particular entry in STQ 117*a* is valid. For example, STQ controller 405 may determine the validity of a particular entry by examining the contents of associated valid bit 417. In response to STQ controller 405 determining that the entry is not valid, the process returns to block 802 and proceeds in an iterative fashion. Returning again to block 802, if STQ controller 405 determines that the store queue entry is valid, the process proceeds to decision block 804 where STQ controller 405 determines whether all dependency bits in dependency matrix 408 for the entry are cleared.

In response to all dependency bits not being cleared for the entry in block 804, control returns to block 802. In response to all dependency bits being cleared for the entry in block 804, control transfers to decision block 806 where STQ controller 405 determines whether the entry is an entry for a SYNC. If the entry does not correspond to a SYNC (i.e., the entry corresponds to a store) in block 806, control transfers to decision block 810 where STQ controller 405 determines whether gathering is closed (i.e., whether gather bit 412 for the STQ entry is reset) for the store.

If STQ controller 405 determines that the entry has not finished gathering associated store operations into the entry in block 810, control transfers to block 802. However, if STQ controller 405 determines that the entry has finished gathering in block 810, control transfers to block 812 where STQ controller 405 marks the entry (e.g., in an unillustrated control bit of control bits 415) as available for dispatch. Following block 812 control transfers to block 802 where the process continues iteratively.

Returning to block 806, when STQ controller 405 determines that the entry is for a SYNC, control transfers to block 808 where the STQ controller 405 determines whether all RC machines 421 that are performing stores have completed processing of their store operations. Conventionally, RC machines 421 do not complete a store operation until the store's effects have propagated to all other processor cores or achieved the same net effect. In response to a determination at block 808 that all RC machines 421 have not completed performing their respective stores, control transfers to block 802. The barrier waiting for all RC machines 421 to complete store operations for all threads partially ensures A and B cumulativity, but may order more store operations than is strictly necessary. In response to a determination at block 808 that all RC machines 421 processing store operations have completed their processing, control transfers to block 812 where STQ controller 405 marks the entry in STQ 117*a* for the SYNC operation as available for dispatch.

Figure 9:
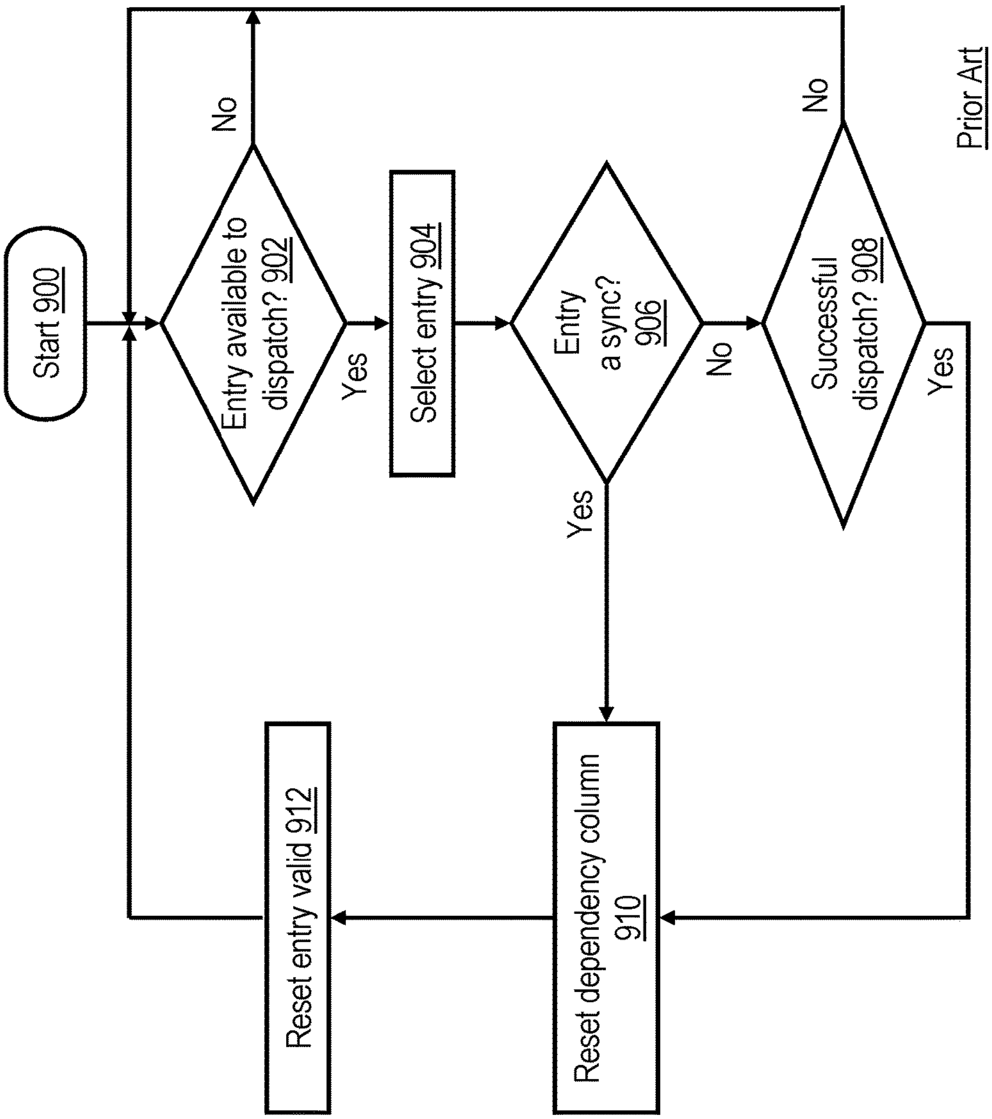
FIG. 9 is a flowchart of an exemplary conventional process for setting dependencies for dispatched entries in a conventional STQ.

With reference to FIG. 9, a flowchart of an exemplary conventional process for dispatching entries in STQ 117*a* to RC machines 421 and resetting associated entries in dependency matrix 408 is illustrated. The process is initiated at block 900, at which point control transfers to decision block 902. In block 902, STQ controller 405 determines whether or not an entry in STQ 117*a* is available for dispatch (i.e., whether an entry is marked available for dispatch as described above with respect to FIG. 8). In response to an entry not being available for dispatch, control loops on block 902. In response to an entry being available for dispatch in block 902, control transfers to block 904 where STQ controller 405 selects an entry that is available for dispatch. Next, in decision block 906, STQ controller 405 determines whether the selected entry contains a SYNC operation. In response to the entry containing a SYNC in block 906, control transfers to block 910 (a SYNC requires no direct processing by an RC machine 421, but rather is complete based on waiting for RC machines 421 to complete their prior store operations).

In block 910, STQ controller 405 resets the dependency column in dependency matrix 408 corresponding to the dispatched entry to indicate the STQ entries formerly dependent on the just dispatched entry are no longer dependent on that entry. For example, if entry 0 is dependent on entry 1, a '1' in row 0, column 1 of dependency matrix 408 indicates this dependency. When entry 1 dispatches, row 0, column 1 and column 1 in all other rows besides row 1 of dependency matrix 408 are updated with a '0' to remove the dependency of any entries in STQ 117*a* on the recently dispatched entry 1. Next, in block 912, STQ controller 405 resets the valid bit for the selected entry (indicating that the selected entry is no longer valid and may be used by a new operation that is received at STQ 117*a*).

In response to the selected entry not being a SYNC in block 906 (i.e., the entry corresponds to a store), control transfers to decision block 908. In block 908, STQ controller 405 determines whether the entry successfully dispatched to an RC machine 421. In response to STQ controller 405 determining that the entry was not successfully dispatched to an RC machine 421 (e.g., an RC machine 421 was not available) in block 908, control transfers to block 902. In response to the STQ controller 405 determining that the entry was successfully dispatched to an RC machine 421 in block 908, control transfers to block 910, then to block 912, which have been described, and finally to block 902.

According to one embodiment of the present disclosure, the ordering effects of barriers are applied in a more precise manner to reduce undue ordering effects for operations that are not required to be ordered by determining whether a store hits or misses in an L1 cache. That is, if a store did not hit in an L1 cache then certain dependency chains that were previously built for a SYNC operation, but were not actually required to be built, may be avoided. As one example, for SYNC operations, stores on unrelated threads that did not hit in an L1 cache may be ignored when building a dependency chain for the SYNC operations. More specifically, in processor chips configured according to the present disclosure a SYNC operation may ignore prior stores in other threads that did not hit in an L1 cache, because by definition such stores cannot be read early.

With reference to FIG. 10, store queue (STQ) 117 of processor chip 101 of FIG. 1 is illustrated in additional detail, as receiving a level one (L1) cache hit (L1 hit) signal 1020 from processor core 103. As illustrated, STQ 117 includes a collection of store queue entries 1010 comprised of standard registers for storing information regarding store and barrier operations, namely address register 1011, data register 1013, control bits 1015, and valid bit 1017. Address register 1011 contains the address, if applicable, of the operation in the entry, data register 1013 contains store data values if the entry holds a store operation, and valid bit 1017 indicates that entry contains a valid operation. STQ 117 also includes a byte enable register (not shown) that includes a number of bits, each corresponding to a smallest size of store granule within data register 1013 indicating those bytes, if any, in register 1013 that contain valid data. Among other control information, control bits 1015 also include a gather bit 1012, a transaction type (ttype) field 1014, a SYNC active bit 1016, and a L1 hit bit 1018. Gather bit 1012 is utilized to determine whether subsequent store operations to the same address may be gathered (also known as coalescing) into the entry. The interval of time in which gather bit 1012 is active is known as a 'gather window'. Such gathering of stores reduces traffic to L2 cache 107 and to main memory 109. Transaction type (ttype) field 1014 is utilized to indicate the type of operation contained in the entry within STQ 117, minimally whether the associated operation is a store or some form of barrier instruction (SYNC). SYNC active bit 1016 indicates whether a SYNC is 'active' (i.e., a SYNC being 'active' means that the SYNC has a younger store that hit in the L1 cache and therefore it is possible that a B-cumulativity chain can be built off the younger store) and L1 hit bit 1018 indicates whether an operation hit in L1 cache 105. For simplicity, the discussion herein utilizes cache lines having a length/capacity of 128-bytes that are updated via a plurality of processor-issued store operations.

STQ 117 also includes a dependency matrix 1008 that includes a number of bits, where each row represents dependencies of each store queue entry on other store queue entries. For example, a '1' in a row indicates that the entry corresponding to that row cannot be dispatched until the STQ entry corresponding to the column with the '1' has dispatched and, if necessary, completed processing in RC machine 1021. For example, as depicted in FIG. 10, store queue entry '0' is dependent on store queue entry '1' and, as such, store queue entry '0' cannot be dispatched before store queue entry '1' has been dispatched and completed processing in RC machine 1021. STQ controller 1005 includes a write select (Wr_sel) pointer 1004 and arbitration (Arb) logic 1006. Write select pointer 1004 selects empty entries to hold new operations when a processor core 103 sends a new operation to STQ 117 that does not gather into an existing entry. It should be appreciated that write select pointer 1004 can utilize any appropriate algorithm to select an empty store queue entry, such as with a priority encode algorithm that enables write select pointer 1004 to select an empty entry from any entry with valid bit 1017 set to '0' (indicating an entry that may be overwritten).

Arbitration logic 1006 examines STQ 117 for eligible entries to send to RC dispatch logic 1019 for dispatch to RC machines 1021. A store queue entry 1010 is eligible for transmission to RC dispatch logic 1019 when the dependency matrix row corresponding to the particular store queue entry indicates that all dependencies are cleared and other necessary processing in RC machines 1021 have completed. RC machines 1021 independently and concurrently service load (LD) and store (ST) requests received from an affiliated processor core 103.

In order to service remote memory access requests originating from non-affiliated processor cores 103, i.e., processor cores that do not share an L2 cache 107, L2 cache 107 may also include multiple snoop machines (not shown). Each snoop machine can independently and concurrently handle a remote memory access request "snooped" from local interconnect 111. As will be appreciated, the servicing of memory access requests by RC machines 1021 may require the replacement or invalidation of memory blocks within a cache array (not shown) of L2 cache 107. L2 cache 107 may also include CO (castout) machines (not shown) that manage the removal and writeback of memory blocks from the cache array. While an RC machine 1021 is processing a local memory access request, RC machine 1021 has a busy status and is not available to service another request. RC machine 1021 may, however, perform a directory write to update a relevant entry of a directory while busy. In addition, RC machine 1021 may also perform a cache write to update the relevant cache line of a cache array and other functions.

Figure 11:
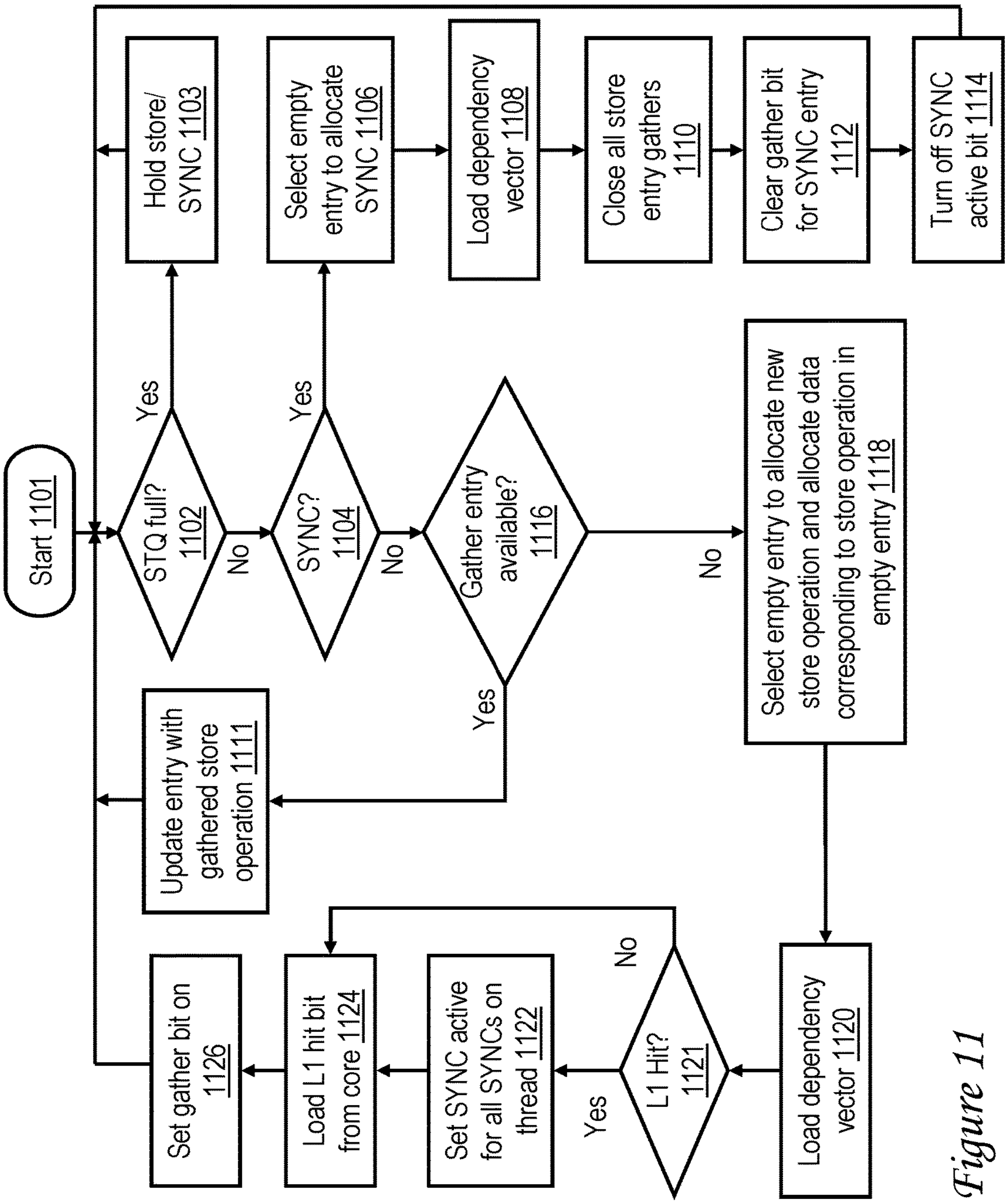
FIG. 11 is a flowchart of an exemplary process for handling barriers (i.e., SYNCs) and stores, according to one embodiment of the present disclosure.

FIG. 11 is a high-level logical flowchart depicting an exemplary process employed in writing a new store queue entry in response to a STQ receiving a new store or SYNC operation from an associated processor core, according to an embodiment of the present disclosure. The process of FIG. 11 begins at block 1101 in response to, for example, a processor core 103 issuing a store operation or a SYNC operation to STQ 117. In decision block 1102, STQ controller 1005 determines whether STQ 117 is full. In response to STQ 117 being full in block 1102 control transfers to block 1103, where STQ controller 1005 sends a message instructing processor core 103 to halt sending store operations and SYNCS until some entries in STQ 117 have been dispatched by associated RC dispatch logic 1019. From block 1103, control returns to block 1102.

In response to STQ 117 not being full in block 1102 control transfers to decision block 1104, where STQ controller 1005 determines whether the issued operation is a SYNC. In response to the issued operation being a SYNC, control transfers to block 1106. In block 1106, STQ controller 1005 selects an empty entry in STQ 117 in which to allocate the SYNC. Next, in block 1108, STQ controller 1005 sets the dependency vector in dependency matrix 1008 for the SYNC (see blocks 1214, 1216, 1218, and 1210 of FIG. 12). For example, if for a new SYNC operation write select pointer 1004 updates store queue entry '0' and STQ controller 1005 determines that entry '0' is dependent only on entry '1', STQ controller 1005 enters a '1' into row 0, column 1 of dependency matrix 1008 while entering a '0' in the rest of the columns in row 0. Next, in block 1110, STQ controller 1005 closes all currently active store entry gather bits 1012 to ensure that a store after the barrier does not re-order ahead of the barrier by gathering into an older entry in STQ 117. Then, in block 1112, STQ controller 1005 clears gather bit 1012 for the SYNC entry (stores and other SYNCS may not gather with a SYNC). Next, in block 1114, STQ controller 1005 turns off SYNC active bit 1016. From block 1114 control returns to block 1102.

In response to the issued operation not being a SYNC in block 1104 (i.e., a store operation was received at STQ 117), control transfers to decision block 1116 where STQ controller 1005 determines, by examining address registers 1011 and gather bits 1012, whether an existing entry (for the same cache line address) is currently available for gathering the store operation. It should be appreciated that gathering of store operations involves combining a series of store operations writing to the same cache line in STQ 117 in the same store queue entry before the cache line is dispatched to the RC dispatch logic 1019. If STQ controller 1005 determines that the new store operation can be gathered into an existing STQ entry, the process continues to block 1111, where STQ controller 1005 updates gatherable entry data field 1013 with data of the new store operation. From block 1111, control returns to block 1102 and continues in an iterative fashion.

In response to a determination at block 1116 that the new store operation cannot be gathered into an existing STQ entry, control transfers to block 1118. In block 1118 STQ controller 1005 (using write select pointer 1004) selects an empty entry to allocate to the new store operation. The new data, address, and byte enable data corresponding to the new store operation are inserted into the new entry by STQ controller 1005. Next, in block 1120, STQ controller 1005 loads bits in dependency matrix 1008 (if appropriate) that correspond to valid entries in STQ 117 that have a dependent relationship with the new entry (see blocks 1204, 1206, 1208, and 1210 of FIG. 12). Then, in decision block 1121, STQ controller 1005 determines whether an L1 hit occurred for the store operation (as indicated by L1 hit bit 1018). In response to an L1 hit not occurring for the store operation in block 1121 control transfers to block 1124. In response to an L1 hit occurring for the store operation in block 1121 control transfers to block 1122. In block 1122, STQ controller 1005 sets SYNC active bits 1016 for all SYNCs on the thread. Next, in block 1124 STQ controller 1005 loads L1 hit bit 1018 for the store from processor core 103. As previously noted, L1 hit bit 1018 indicates whether the store hit or missed in L1 cache 105. Then, in block 1126 STQ controller 1005 sets gather bit 1012 of the new entry to enable store gathering in the new entry. Following block 1126 control returns to block 1102.

Figure 12:
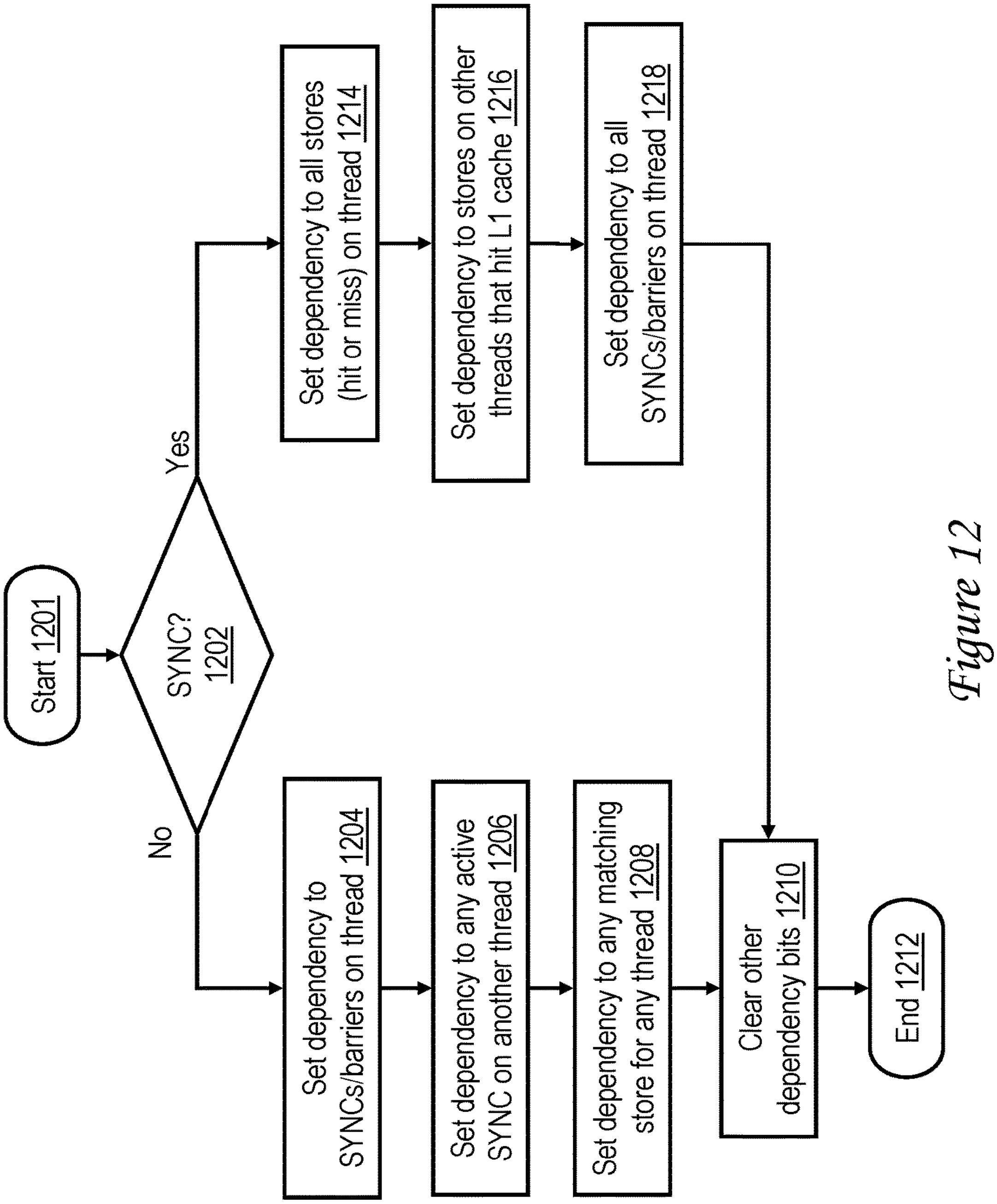
FIG. 12 is a flowchart of an exemplary process for setting dependencies for SYNCs and stores, according to one embodiment of the present disclosure.

With reference to FIG. 12, a flowchart of an exemplary process for loading dependencies in dependency matrix 1008 for SYNCs and stores in STQ 117 of FIG. 10 is illustrated, according to an embodiment of the present disclosure. The process is initiated in block 1201 in response to STQ 117 receiving an operation (i.e., a SYNC or store operation) from processor core 103. Next, in decision block 1202 STQ controller 1005 determines whether the received operation is a SYNC. In response to the received operation being a SYNC in block 1202, control transfers to block 1214 where STQ controller 1005 sets a dependency in dependency matrix 1008 for the SYNC to all existing valid stores (hit or miss) on an associated thread. Next, in block 1216, STQ controller 1005 sets a dependency in dependency matrix 1008 to stores on other threads that hit in L1 cache 105, as indicated by an associated L1 hit bit 1018. Then, in block 1218, STQ controller 1005 sets a dependency in dependency matrix 1008 to all SYNCs/barriers on the associated thread. Next, in block 1210, STQ controller 1005 clears other dependency bits. Following block 1210, control transfers to block 1212 where the process terminates.

In response to the received operation not being a SYNC (i.e., the received operation is a store) in block 1202, control transfers to block 1204 where STQ controller 1005 sets a dependency for the store to SYNCs/barriers on an associated thread. Then, in block 1206, STQ controller 1005 sets a dependency to any active SYNC, as indicated by SYNC active bits 1016, on another thread. Next, in block 1208, STQ controller 1005 sets a dependency to any matching store (i.e., a store that shares the same target address) for any thread. Following block 1208 control transfers to block 1210 and then to block 1212, where the process terminates.

It should be appreciated that the dependencies set by the process of FIG. 12 are but one possible choice. In many instances, specific dependencies set by the process of FIG. 12 may be redundant with combinations of other prior dependencies. As a specific example, if a prior SYNC has a dependency to an older store that is an L1 hit, a subsequent store would not be required to make an explicit dependency to the older store, but rather could instead be dependent on the prior SYNC which would itself order the prior store ahead of the newly arriving store. The set of dependencies set by the process of FIG. 12 while redundant in some instances, are intended to relieve complexity in the implementation (in the example given, it is more complex to detect the transitive dependency than to simply set the redundant dependency). These redundant dependencies do not alter the order operations are processed though the store queue nor do they additionally delay operations through the store queue. Thus, any implementation that employs L1 hit/miss information to optimize the dependencies falls within the scope of the appended claims.

According to another embodiment of the present disclosure, the fact that data processing systems implement multiple logical partitions (LPARs) or virtual machines (VMs) may be used to apply the ordering effects of barriers in a more precise manner to reduce undue ordering effects for operations that are not required to be ordered by determining whether a store is executing on a same LPAR. In various embodiments, in a multi-threaded processor each thread may execute its own LPAR. When changing a thread from a first LPAR to a second LPAR a hypervisor typically ensures that all stores of the thread are drained from a store queue in a lower level cache before switching to a different LPAR for the thread. As is known, an operating system (OS) and/or user level code executing within one LPAR is usually not allowed to share addresses with an OS and/or user code executing within a different LPAR. As such, if a store is not executing on a same LPAR then certain dependency chains that were previously built for a SYNC operation, but were not actually required to be built, may be avoided. As one example, for SYNC operations, stores on unrelated threads that are in a different LPAR may be ignored when building a dependency chain for the SYNC operations. More specifically, in processor chips configured according to the present disclosure a SYNC operation may ignore prior stores in other threads whose LPAR is not the same as an LPAR for the SYNC operation, because by definition such stores cannot be read early.

With reference to FIG. 13, store queue (STQ) 117 of processor chip 101 of FIG. 1 is illustrated in additional detail according to another embodiment of the present disclosure, as receiving a logical partition (LPAR) signal 1320 from processor core 103. As illustrated, STQ 117 includes a collection of store queue entries 1310 comprised of standard registers for storing information regarding store and barrier operations, namely address register 1311, data register 1313, control bits 1315, and valid bit 1317. Address register 1311 contains the address, if applicable, of the operation in the entry, data register 1313 contains store data values if the entry holds a store operation, and valid bit 1317 indicates that entry contains a valid operation. STQ 117 also includes a byte enable register (not shown) that includes a number of bits, each corresponding to a smallest size of store granule within data register 1313 indicating those bytes, if any, in register 1313 that contain valid data. Among other control information, control bits 1315 also include a gather bit 1312, a transaction type (ttype) field 1314, a SYNC active bit 1316, and a LPAR bit(s) 1318. Gather bit 1312 is utilized to determine whether subsequent store operations to the same address may be gathered (also known as coalescing) into the entry. The interval of time in which gather bit 1312 is active is known as a 'gather window'. Such gathering of stores reduces traffic to L2 cache 107 and to main memory 109. Transaction type (ttype) field 1314 is utilized to indicate the type of operation contained in the entry within STQ 117, minimally whether the associated operation is a store or some form of barrier instruction (SYNC). SYNC active bit 1316 indicates whether a SYNC is 'active' (i.e., a SYNC being 'active' means that the SYNC has a younger store that hit in the L1 cache and therefore it is possible that a B-cumulativity chain can be built off the younger store) and LPAR bit(s) 1318 indicate an LPAR for an operation. For simplicity, the discussion herein utilizes cache lines having a length/capacity of 128-bytes that are updated via a plurality of processor-issued store operations.

STQ 117 also includes a dependency matrix 1308 that includes a number of bits, where each row represents dependencies of each store queue entry on other store queue entries. For example, a '1' in a row indicates that the entry corresponding to that row cannot be dispatched until the STQ entry corresponding to the column with the '1' has dispatched and, if necessary, completed processing in RC machine 1321. For example, as depicted in FIG. 13, store queue entry '0' is dependent on store queue entry '1' and, as such, store queue entry '0' cannot be dispatched before store queue entry '1' has been dispatched and completed processing in RC machine 1321. STQ controller 1305 includes a write select (Wr_sel) pointer 1304 and arbitration (Arb) logic 1306. Write select pointer 1304 selects empty entries to hold new operations when a processor core 103 sends a new operation to STQ 117 that does not gather into an existing entry. It should be appreciated that write select pointer 1304 can utilize any appropriate algorithm to select an empty store queue entry, such as with a priority encode algorithm that enables write select pointer 1304 to select an empty entry from any entry with valid bit 1317 set to '0' (indicating an entry that may be overwritten).

Arbitration logic 1306 examines STQ 117 for eligible entries to send to RC dispatch logic 1319 for dispatch to RC machines 1321. A store queue entry 1310 is eligible for transmission to RC dispatch logic 1319 when the dependency matrix row corresponding to the particular store queue entry indicates that all dependencies are cleared and other necessary processing in RC machines 1321 have completed. RC machines 1321 independently and concurrently service load (LD) and store (ST) requests received from an affiliated processor core 103.

In order to service remote memory access requests originating from non-affiliated processor cores 103, i.e., processor cores that do not share an L2 cache 107, L2 cache 107 may also include multiple snoop machines (not shown). Each snoop machine can independently and concurrently handle a remote memory access request "snooped" from local interconnect 111. As will be appreciated, the servicing of memory access requests by RC machines 1321 may require the replacement or invalidation of memory blocks within a cache array (not shown) of L2 cache 107. L2 cache 107 may also include CO (castout) machines (not shown) that manage the removal and writeback of memory blocks from the cache array. While an RC machine 1321 is processing a local memory access request, RC machine 1321 has a busy status and is not available to service another request. RC machine 1321 may, however, perform a directory write to update a relevant entry of a directory while busy. In addition, RC machine 1321 may also perform a cache write to update the relevant cache line of a cache array and other functions.

Figure 14:
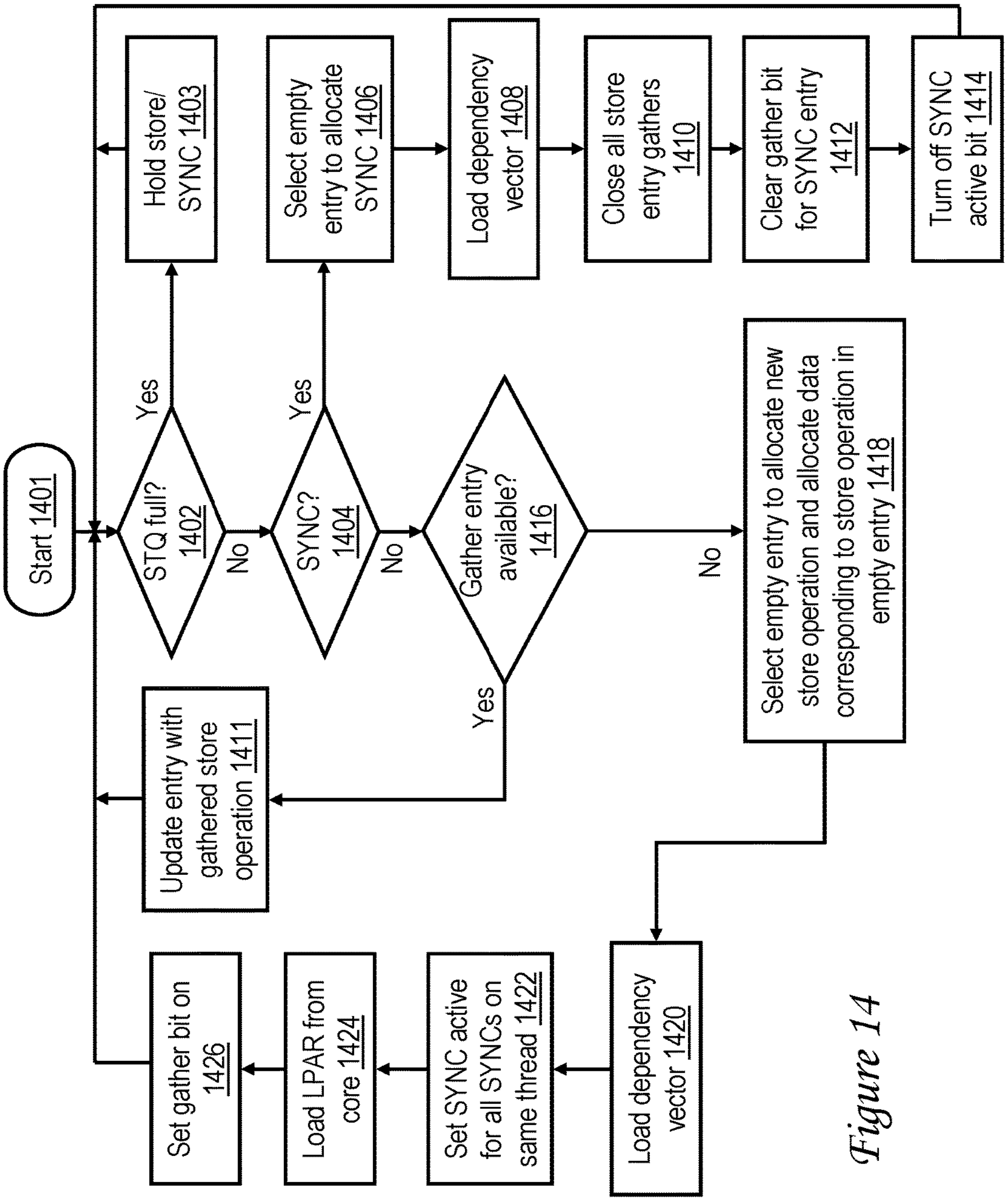
FIG. 14 is a flowchart of an exemplary process for handling barriers (i.e., SYNCs) and stores, according to another embodiment of the present disclosure.

FIG. 14 is a high-level logical flowchart depicting an exemplary process employed in writing a new store queue entry in response to a store queue (STQ) receiving a new store or SYNC operation from an associated processor core, according to an embodiment of the present disclosure. The process of FIG. 14 begins at block 1401 in response to, for example, a processor core 103 issuing a store operation or a SYNC operation to STQ 117. In decision block 1402, STQ controller 1305 determines whether STQ 117 is full. In response to STQ 117 being full in block 1402 control transfers to block 1403, where STQ controller 1305 sends a message instructing processor core 103 to halt sending store operations and SYNCs until some entries in STQ 117 have been dispatched by associated RC dispatch logic 1319. From block 1403, control returns to block 1402.

In response to STQ 117 not being full in block 1402 control transfers to decision block 1404, where STQ controller 1305 determines whether the issued operation is a SYNC. In response to the issued operation being a SYNC, control transfers to block 1406. In block 1406, STQ controller 1305 selects an empty entry in STQ 117 in which to allocate the SYNC. Next, in block 1408, STQ controller 1305 sets the dependency vector in dependency matrix 1308 for the SYNC (see blocks 1514, 1516, 1518, and 1510 of FIG. 15). For example, if for a new SYNC operation write select pointer 1304 updates store queue entry '0' and STQ controller 1305 determines that entry '0' is dependent only on entry '1', STQ controller 1305 enters a '1' into row 0, column 1 of dependency matrix 1308 while entering a '0' in the rest of the columns in row 0. Next, in block 1410, STQ controller 1305 closes all currently active store entry gather bits 1312 to ensure that a store after the barrier does not re-order ahead of the barrier by gathering into an older entry in STQ 117. Then, in block 1412, STQ controller 1305 clears gather bit 1312 for the SYNC entry (stores and other SYNCs may not gather with a SYNC). Next, in block 1414, STQ controller 1305 turns off SYNC active bit 1316. From block 1414 control returns to block 1402.

In response to the issued operation not being a SYNC in block 1404 (i.e., a store operation was received at STQ 117), control transfers to decision block 1416 where STQ controller 1305 determines, by examining address registers 1311 and gather bits 1312, whether an existing entry (for the same cache line address) is currently available for gathering the store operation. It should be appreciated that gathering of store operations involves combining a series of store operations writing to the same cache line in STQ 117 in the same store queue entry before the cache line is dispatched to the RC dispatch logic 1319. If STQ controller 1305 determines that the new store operation can be gathered into an existing STQ entry, the process continues to block 1411, where STQ controller 1305 updates gatherable entry data field 1313 with data of the new store operation. From block 1411, control returns to block 1402 and continues in an iterative fashion.

In response to a determination at block 1416 that the new store operation cannot be gathered into an existing STQ entry, control transfers to block 1418. In block 1418 STQ controller 1305 (using write select pointer 1304) selects an empty entry to allocate to the new store operation. The new data, address, and byte enable data corresponding to the new store operation are inserted into the new entry by STQ controller 1305. Next, in block 1420, STQ controller 1305 loads bits in dependency matrix 1308 (if appropriate) that correspond to valid entries in STQ 117 that have a dependent relationship with the new entry (see blocks 1504, 1506, 1508, and 1510 of FIG. 15). Then, in block 1422, STQ controller 1305 sets SYNC active bits 1316 for all SYNCs on an associated (same) thread. Next, in block 1424 STQ controller 1305 loads LPAR bit(s) 1318 for the store from processor core 103. As previously noted, LPAR bits 1318 indicate an LPAR for the store. Then, in block 1426 STQ controller 1305 sets gather bit 1312 of the new entry to enable store gathering in the new entry. Following block 1426 control returns to block 1402.

Figure 15:
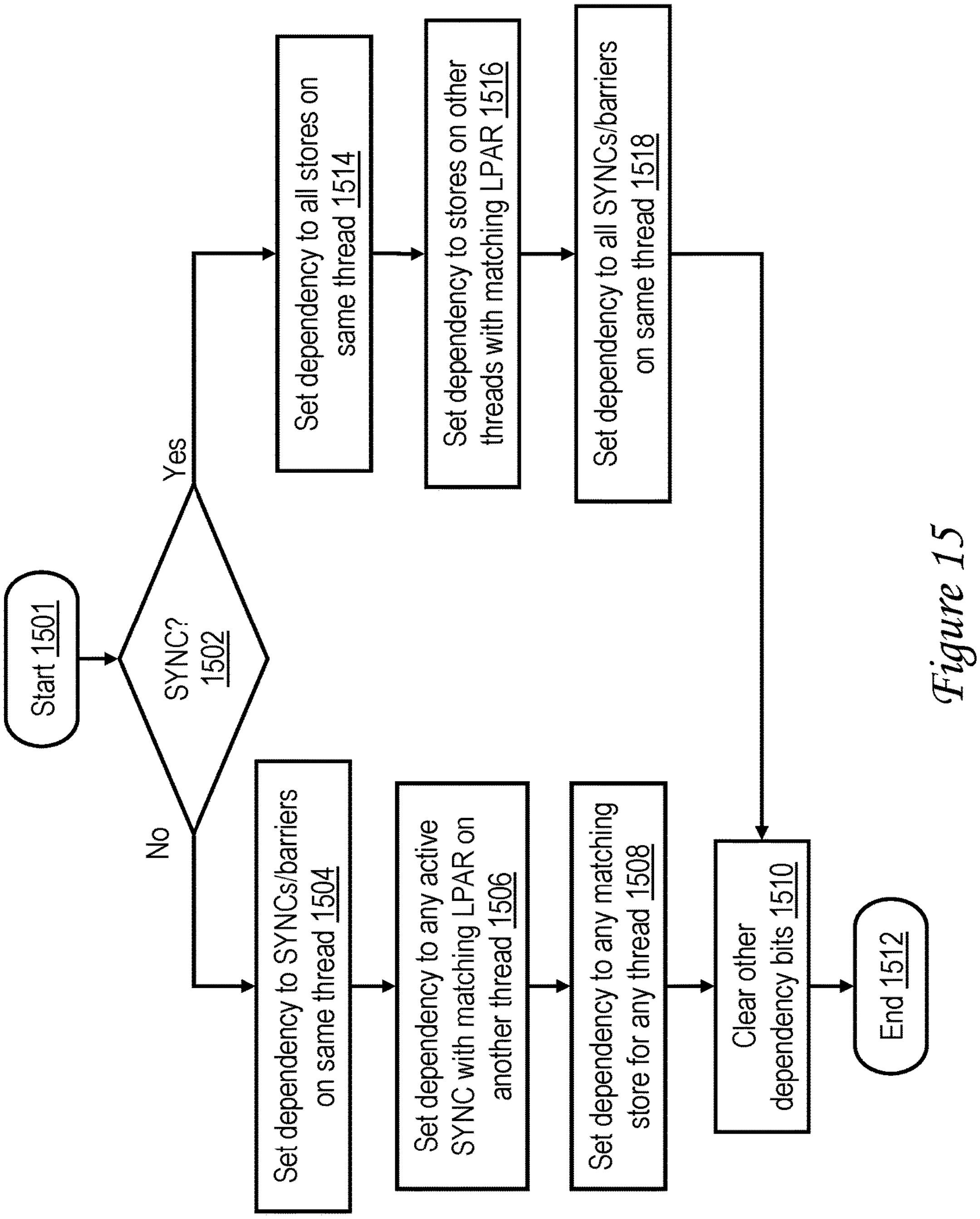
FIG. 15 is a flowchart of an exemplary process for setting dependencies for SYNCs and stores, according to another embodiment of the present disclosure.

With reference to FIG. 15, a flowchart of an exemplary process for loading dependencies in dependency matrix 1308 for SYNCs and stores in STQ 117 of FIG. 13 is illustrated, according to an embodiment of the present disclosure. The process is initiated in block 1501 in response to STQ 117 receiving an operation (i.e., a SYNC or store operation) from processor core 103. Next, in decision block 1502 STQ controller 1305 determines whether the received operation is a SYNC. In response to the received operation being a SYNC in block 1502, control transfers to block 1514 where STQ controller 1305 sets a dependency in dependency matrix 1308 for the SYNC to all existing valid stores on an associated (same) thread. Next, in block 1516, STQ controller 1305 sets a dependency in dependency matrix 1308 to stores on other threads that have a matching LPAR, as indicated by an associated LPAR bits 1318. Then, in block 1518, STQ controller 1305 sets a dependency in dependency matrix 1308 to all SYNCs/barriers on the associated (same) thread. Next, in block 1510, STQ controller 1305 clears other dependency bits. Following block 1510, control transfers to block 1512 where the process terminates.

In response to the received operation not being a SYNC (i.e., the received operation is a store) in block 1502, control transfers to block 1504 where STQ controller 1305 sets a dependency for the store to SYNCs/barriers on the associated (same) thread. Then, in block 1506, STQ controller 1305 sets a dependency to any active SYNC, as indicated by SYNC active bits 1316, with a matching LPAR on another thread. Next, in block 1508, STQ controller 1305 sets a dependency to any matching store (i.e., a store that shares the same target address) for any thread, as by definition any matching store is on the same LPAR. Following block 1508 control transfers to block 1510 and then to block 1512, where the process terminates.

It should be appreciated that the dependencies set by the process of FIG. 15 are but one possible choice. In many instances, specific dependencies set by the process of FIG. 15 may be redundant with combinations of other prior dependencies. As a specific example, if a prior SYNC has a dependency to an older store that is on a same LPAR, a subsequent store would not be required to make an explicit dependency to the older store, but rather could instead be dependent on the prior SYNC which would itself order the prior store ahead of the newly arriving store. The set of dependencies set by the process of FIG. 15 while redundant in some instances, are intended to relieve complexity in the implementation (in the example given, it is more complex to detect the transitive dependency than to simply set the redundant dependency). These redundant dependencies do not alter the order operations are processed though the store queue nor do they additionally delay operations through the store queue. Thus, any implementation that employs LPAR information to optimize the dependencies falls within the scope of the appended claims.

According to another embodiment of the present disclosure, the ordering effects of barriers are applied in a more precise manner to reduce undue ordering effects for operations that are not required to be ordered by determining whether a store hits or misses in an L1 cache and an LPAR of a thread that includes the store. That is, if a store did not hit in an L1 cache or is not in a same LPAR then certain dependency chains that were previously built for a SYNC operation, but were not actually required to be built, may be avoided. As one example, for SYNC operations, stores on unrelated threads that did not hit in an L1 cache may be ignored when building a dependency chain for the SYNC operations. More specifically, in processor chips configured according to the present disclosure a SYNC operation may ignore prior stores in other threads that did not hit in an L1 cache or that are in a different LPAR, because by definition such stores cannot be read early.

With reference to FIG. 16, store queue (STQ) 117 of processor chip 101 of FIG. 1 is illustrated in additional detail according to yet another embodiment of the present disclosure, as receiving a level one (L1) cache hit (L1 hit) signal 1620 and an LPAR signal 1624 from processor core 103. As illustrated, STQ 117 includes a collection of store queue entries 1610 comprised of standard registers for storing information regarding store and barrier operations, namely address register 1611, data register 1613, control bits 1615, and valid bit 1617. Address register 1611 contains the address, if applicable, of the operation in the entry, data register 1613 contains store data values if the entry holds a store operation, and valid bit 1617 indicates that entry contains a valid operation. STQ 117 also includes a byte enable register (not shown) that includes a number of bits, each corresponding to a smallest size of store granule within data register 1613 indicating those bytes, if any, in register

1613 that contain valid data. Among other control information, control bits 1615 also include a gather bit 1612, a transaction type (ttype) field 1614, a SYNC active bit 1616, a L1 hit bit 1618, and LPAR bit(s) 1622. Gather bit 1612 is utilized to determine whether subsequent store operations to the same address may be gathered (also known as coalescing) into the entry. The interval of time in which gather bit 1612 is active is known as a 'gather window'. Such gathering of stores reduces traffic to L2 cache 107 and to main memory 109. Transaction type (ttype) field 1614 is utilized to indicate the type of operation contained in the entry within STQ 117, minimally whether the associated operation is a store or some form of barrier instruction (SYNC). SYNC active bit 1616 indicates whether a SYNC is 'active' (i.e., a SYNC being 'active' means that the SYNC has a younger store that hit in the L1 cache and therefore it is possible that a B-cumulativity chain can be built off the younger store), L1 hit bit 1618 indicates whether an operation hit in L1 cache 105, and LPAR bits 1622 indicate an LPAR of an operation. For simplicity, the discussion herein utilizes cache lines having a length/capacity of 128-bytes that are updated via a plurality of processor-issued store operations.

STQ 117 also includes a dependency matrix 1608 that includes a number of bits, where each row represents dependencies of each store queue entry on other store queue entries. For example, a '1' in a row indicates that the entry corresponding to that row cannot be dispatched until the STQ entry corresponding to the column with the '1' has dispatched and, if necessary, completed processing in RC machine 1621. For example, as depicted in FIG. 16, store queue entry '0' is dependent on store queue entry '1' and, as such, store queue entry '0' cannot be dispatched before store queue entry '1' has been dispatched and completed processing in RC machine 1621. STQ controller 1605 includes a write select (Wr_sel) pointer 1604 and arbitration (Arb) logic 1606. Write select pointer 1604 selects empty entries to hold new operations when a processor core 103 sends a new operation to STQ 117 that does not gather into an existing entry. It should be appreciated that write select pointer 1604 can utilize any appropriate algorithm to select an empty store queue entry, such as with a priority encode algorithm that enables write select pointer 1604 to select an empty entry from any entry with valid bit 1617 set to '0' (indicating an entry that may be overwritten).

Arbitration logic 1606 examines STQ 117 for eligible entries to send to RC dispatch logic 1619 for dispatch to RC machines 1621. A store queue entry 1610 is eligible for transmission to RC dispatch logic 1619 when the dependency matrix row corresponding to the particular store queue entry indicates that all dependencies are cleared and other necessary processing in RC machines 1621 have completed. RC machines 1621 independently and concurrently service load (LD) and store (ST) requests received from an affiliated processor core 103.

In order to service remote memory access requests originating from non-affiliated processor cores 103, i.e., processor cores that do not share an L2 cache 107, L2 cache 107 may also include multiple snoop machines (not shown). Each snoop machine can independently and concurrently handle a remote memory access request "snooped" from local interconnect 111. As will be appreciated, the servicing of memory access requests by RC machines 1621 may require the replacement or invalidation of memory blocks within a cache array (not shown) of L2 cache 107. L2 cache 107 may also include CO (castout) machines (not shown) that manage the removal and writeback of memory blocks from the cache array. While an RC machine 1621 is processing a local memory access request, RC machine 1621 has a busy status and is not available to service another request. RC machine 1621 may, however, perform a directory write to update a relevant entry of a directory while busy. In addition, RC machine 1621 may also perform a cache write to update the relevant cache line of a cache array and other functions.

Figure 17:
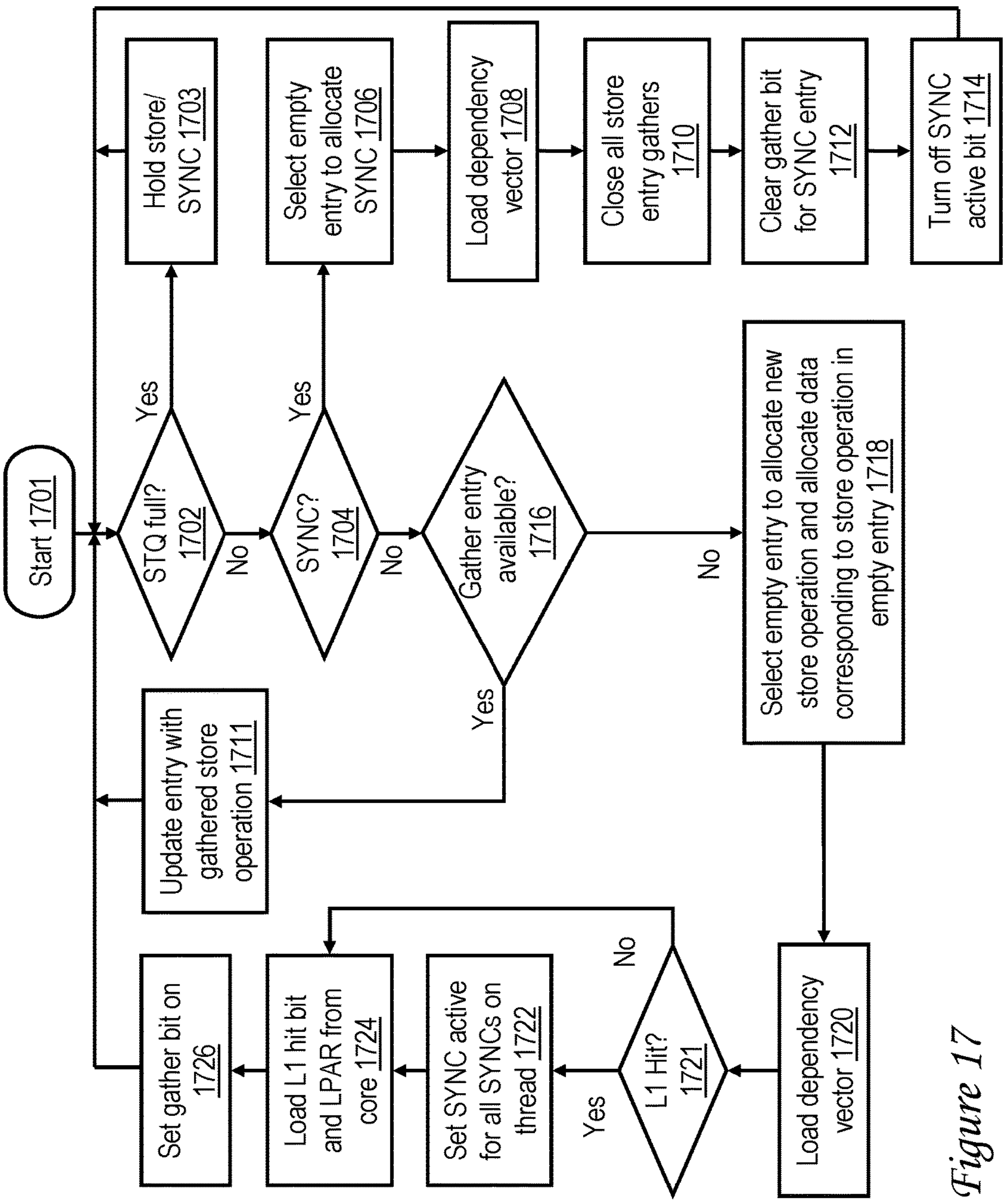
FIG. 17 is a flowchart of an exemplary process for handling barriers (i.e., SYNCs) and stores, according to yet another embodiment of the present disclosure.

FIG. 17 is a high-level logical flowchart depicting an exemplary process employed in writing a new store queue entry in response to a store queue (STQ) receiving a new store or SYNC operation from an associated processor core, according to an embodiment of the present disclosure. The process of FIG. 17 begins at block 1701 in response to, for example, a processor core 103 issuing a store operation or a SYNC operation to STQ 117. In decision block 1702, STQ controller 1605 determines whether STQ 117 is full. In response to STQ 117 being full in block 1702 control transfers to block 1703, where STQ controller 1605 sends a message instructing processor core 103 to halt sending store operations and SYNCs until some entries in STQ 117 have been dispatched by associated RC dispatch logic 1619. From block 1703, control returns to block 1702.

In response to STQ 117 not being full in block 1702 control transfers to decision block 1704, where STQ controller 1605 determines whether the issued operation is a SYNC. In response to the issued operation being a SYNC, control transfers to block 1706. In block 1706, STQ controller 1605 selects an empty entry in STQ 117 in which to allocate the SYNC. Next, in block 1708, STQ controller 1605 sets the dependency vector in dependency matrix 1608 for the SYNC (see blocks 1814, 1816, 1818, and 1810 of FIG. 18). For example, if for a new SYNC operation write select pointer 1604 updates store queue entry '0' and STQ controller 1605 determines that entry '0' is dependent only on entry '1', STQ controller 1605 enters a '1' into row 0, column 1 of dependency matrix 1608 while entering a '0' in the rest of the columns in row 0. Next, in block 1710, STQ controller 1605 closes all currently active store entry gather bits 1612 to ensure that a store after the barrier does not re-order ahead of the barrier by gathering into an older entry in STQ 117. Then, in block 1712, STQ controller 1605 clears gather bit 1612 for the SYNC entry (stores and other SYNCs may not gather with a SYNC). Next, in block 1714, STQ controller 1605 turns off SYNC active bit 1616. From block 1714 control returns to block 1702.

In response to the issued operation not being a SYNC in block 1704 (i.e., a store operation was received at STQ 117), control transfers to decision block 1716 where STQ controller 1605 determines, by examining address registers 1611 and gather bits 1612, whether an existing entry (for the same cache line address) is currently available for gathering the store operation. It should be appreciated that gathering of store operations involves combining a series of store operations writing to the same cache line in STQ 117 in the same store queue entry before the cache line is dispatched to the RC dispatch logic 1619. If STQ controller 1605 determines that the new store operation can be gathered into an existing STQ entry, the process continues to block 1711, where STQ controller 1605 updates gatherable entry data field 1613 with data of the new store operation. From block 1711, control returns to block 1702 and continues in an iterative fashion.

In response to a determination at block 1716 that the new store operation cannot be gathered into an existing STQ entry, control transfers to block 1718. In block 1718 STQ controller 1605 (using write select pointer 1604) selects an empty entry to allocate to the new store operation. The new data, address, and byte enable data corresponding to the new store operation are inserted into the new entry by STQ controller 1605. Next, in block 1720, STQ controller 1605 loads bits in dependency matrix 1608 (if appropriate) that correspond to valid entries in STQ 117 that have a dependent relationship with the new entry (see blocks 1804, 1806, 1808, and 1810 of FIG. 18). Then, in decision block 1721, STQ controller 1605 determines whether an L1 hit occurred for the store operation (as indicated by L1 hit bit 1618). In response to an L1 hit not occurring for the store operation in block 1721 control transfers to block 1724. In response to an L1 hit occurring for the store operation in block 1721 control transfers to block 1722. In block 1722, STQ controller 1605 sets SYNC active bits 1616 for all SYNCs on the thread. Next, in block 1724 STQ controller 1605 loads L1 hit bit 1618 and LPAR bits 1622 for the store from processor core 103. As previously noted, L1 hit bit 1618 indicates whether the store hit or missed in L1 cache 105 and LPAR bits 1622 indicate an LPAR for the store. Then, in block 1726 STQ controller 1605 sets gather bit 1612 of the new entry to enable store gathering in the new entry. Following block 1726 control returns to block 1702.

Figure 18:
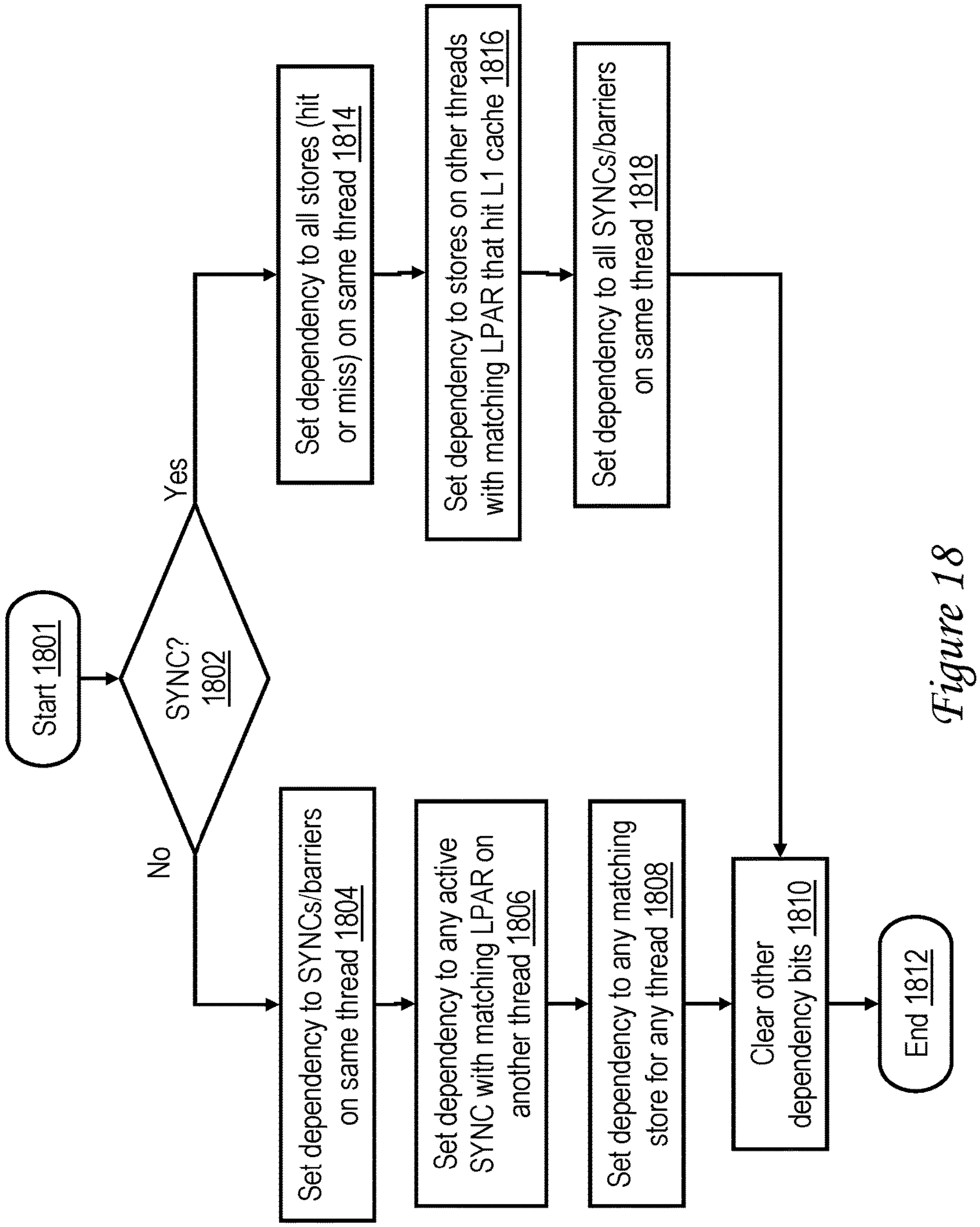
FIG. 18 is a flowchart of an exemplary process for setting dependencies for SYNCs and stores, according to yet another embodiment of the present disclosure.

With reference to FIG. 18, a flowchart of an exemplary process for loading dependencies in dependency matrix 1608 for SYNCs and stores in STQ 117 of FIG. 16 is illustrated, according to an embodiment of the present disclosure. The process is initiated in block 1801 in response to STQ 117 receiving an operation (i.e., a SYNC or store operation) from processor core 103. Next, in decision block 1802 STQ controller 1605 determines whether the received operation is a SYNC. In response to the received operation being a SYNC in block 1802, control transfers to block 1814 where STQ controller 1605 sets a dependency in dependency matrix 1608 for the SYNC to all existing valid stores (hit or miss) on an associated (same) thread. Next, in block 1816, STQ controller 1605 sets a dependency in dependency matrix 1608 to stores on other threads with matching LPARs that hit in L1 cache 105, as indicated by an associated L1 hit bit 1618 and LPAR bits 1622. Then, in block 1818, STQ controller 1605 sets a dependency in dependency matrix 1608 to all SYNCs/barriers on the associated (same) thread. Next, in block 1810, STQ controller 1605 clears other dependency bits. Following block 1810, control transfers to block 1812 where the process terminates.

In response to the received operation not being a SYNC (i.e., the received operation is a store) in block 1802, control transfers to block 1804 where STQ controller 1605 sets a dependency for the store to SYNCs/barriers on an associated (same) thread. Then, in block 1806, STQ controller 1605 sets a dependency to any active SYNC (as indicated by SYNC active bits 1616) with a matching LPAR (as indicated by LPAR bits 1622) on another thread. Next, in block 1808, STQ controller 1605 sets a dependency to any matching store (i.e., a store that shares the same target address) for any thread. Following block 1808 control transfers to block 1810 and then to block 1812, where the process terminates.

Figure 19:
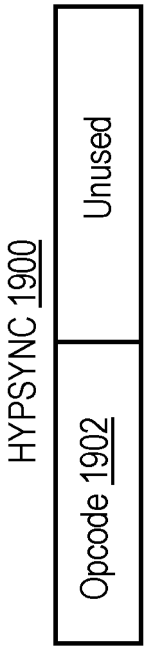
FIG. 19 is a diagram of a hypervisor synchronization (HYPSYNC) instruction, that may be issued to enable/disable the use of logical partition (LPAR) information in handling barriers, according to an embodiment of the present disclosure.

As previously noted, typically, addresses are not shared between LPARs. However, in some cases (e.g., shared memory segments and shared memory regions) LPARs may need to share addresses. In the event that LPARs need to share addresses, the above-described optimizations based on LPARs are not applicable and a technique that allows software to synchronize accesses to shared memory regions and disable the use of LPAR information when handling synchronization instructions is desirable. With reference to FIG. 19, a format for a hypervisor synchronization (HYPSYNC) instruction 1900 is illustrated. As shown, HYPSYNC instruction 1900 includes an operation code (opcode field) 1902. In an alternative embodiment, a control field may be added to a SYNC instruction to enable/disable the use of LPAR information when handling SYNCs instead of implementing HYPSYNC instruction 1900 to disable the use of LPAR information when handling HYPSYNCs. HYPSYNC instruction 1900 may, for example, be issued by a hypervisor to revert to only utilizing L1 hit information (see, for example, FIGS. 10-12) when building a dependency chain for a HYPSYNC. It should be appreciated that a HYPSYNC instruction 1900 may also be issued by an operating system (OS) or a user program. In the event that a HYPSYNC instruction 1900 is issued, LPAR information is not used in building a dependency chain for HYPSYNC instruction 1900.

Accordingly, techniques have been disclosed herein that implement barrier conditions in a manner that more efficiently supports A-cumulativity and B-cumulativity in a weakly-ordered memory system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of operating a lower level cache memory of a data processing system, comprising:

receiving, by a store queue controller, a store operation that is associated with a first thread; and using, by the store queue controller, logical partition (LPAR) information for the store operation to limit dependencies in a dependency data structure of a store queue of the lower level cache memory that are set and to remove dependencies that are otherwise unnecessary, wherein the using further includes:

setting, by the store queue controller, dependencies in the dependency data structure of the store queue of the lower level cache memory for the store operation to synchronization/barrier operations on the first thread.

2. The method of claim 1, wherein the using further comprises:

setting, by the store queue controller, dependencies in the dependency data structure of the store queue of the lower level cache memory for the store operation to any active synchronization operation not on the first thread with LPAR information that matches the LPAR information for the first thread.

3. The method of claim 1, wherein the using further comprises:

using, by the store queue controller, level one (L1) cache memory miss information for the store operation in conjunction with the LPAR information for the store operation to limit dependencies in the dependency data structure of the store queue of the lower level cache memory that are set and to remove dependencies that are otherwise unnecessary.

4. The method of claim 1, wherein the using further comprises:

setting, by the store queue controller, dependencies in the dependency data structure of the store queue of the lower level cache memory for the store operation to any matching store operation on any thread; and clearing, by the store queue controller, all other dependencies in the dependency data structure of the store queue of the lower level cache memory that were not set for the store operation.

5. A lower level cache memory, comprising:

a data array;

a store queue coupled to the data array and configured to buffer synchronization operations and store operations; and a store queue controller coupled to the store queue and configured to:

receive a store operation that is associated with a first thread; and use logical partition (LPAR) information for the store operation to limit dependencies in a dependency data structure of the store queue of the lower level cache memory that are set and to remove dependencies that are otherwise unnecessary, wherein the store queue controller is further configured to:

set dependencies in the dependency data structure of the store queue of the lower level cache memory for the store operation to synchronization/barrier operations on the first thread, wherein the store queue controller includes a write select pointer that selects an empty entry in the store queue to receive a new operation that does not gather into an existing entry in the store queue.

6. The cache memory of claim 5, wherein the store queue controller is further configured to:

set dependencies in the dependency data structure of the store queue of the lower level cache memory for the store operation to any active synchronization operation not on the first thread with LPAR information that matches the LPAR information for the first thread.

7. The cache memory of claim 5, wherein the store queue controller is further configured to:

set dependencies in the dependency data structure of the store queue of the lower level cache memory for the store operation to any matching store operation on any thread; and clear all other dependencies in the dependency data structure of the store queue of the lower level cache memory that were not set for the store operation.

8. The lower level cache of claim 5, wherein the store queue controller is further configured to:

use level one (L1) cache memory miss information for the store operation in conjunction with the LPAR information for the store operation to limit dependencies in the dependency data structure of the store queue of the lower level cache memory that are set and to remove dependencies that are otherwise unnecessary.

9. A data processing system, comprising:

a processor core; and a lower level cache memory coupled to the processor core, wherein the lower level cache memory includes:

a data array;

a store queue coupled to the data array and configured to buffer synchronization operations and store operations; and a store queue controller coupled to the store queue and configured to:

receive a store operation that is associated with a first thread; and use logical partition (LPAR) information for the store operation to limit dependencies in a dependency data structure of the store queue of the lower level cache memory that are set and to remove dependencies that are otherwise unnecessary, wherein the store queue controller is further configured to set dependencies in the dependency data structure of the store queue of the lower level cache memory for the store operation to synchronization/barrier operations on the first thread.

10. The data processing system of claim 9, wherein the store queue controller is further configured to:

set dependencies in the dependency data structure of the store queue of the lower level cache memory for the store operation to any active synchronization operation not on the first thread with LPAR information that matches the LPAR information for the first thread.

11. The data processing system of claim 9, wherein the store queue controller is further configured to:

set dependencies in the dependency data structure of the store queue of the lower level cache memory for the store operation to any matching store operation on any thread; and clear all other dependencies in the dependency data structure of the store queue of the lower level cache memory that were not set for the store operation.

12. The data processing system of claim 9, wherein the store queue controller is further configured to:

use level one (L1) cache memory miss information for the store operation in conjunction with the LPAR information for the store operation to limit dependencies in the dependency data structure of the store queue of the lower level cache memory that are set and to remove dependencies that are otherwise unnecessary.

* * * * *